(12) United States Patent
Dhanda et al.

(10) Patent No.: US 9,025,263 B2
(45) Date of Patent: May 5, 2015

(54) WRITE CURRENT AND FLY HEIGHT ADJUSTMENT FOR COMPENSATING MEDIA COERCIVITY VARIATION

(71) Applicant: HGST Netherlands B.V., Amsterdam (NL)

(72) Inventors: Abhishek Dhanda, San Jose, CA (US); Chris Gimenez, Morgan Hill, CA (US); Toshiki Hirano, San Jose, CA (US); Tetsuo Semba, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 13/959,424

(22) Filed: Aug. 5, 2013

(65) Prior Publication Data
US 2015/0036235 A1    Feb. 5, 2015

(51) Int. Cl.
*G11B 27/36* (2006.01)
*G11B 33/14* (2006.01)
*G11B 21/12* (2006.01)

(52) U.S. Cl.
CPC ............ *G11B 33/1406* (2013.01); *G11B 27/36* (2013.01); *G11B 21/12* (2013.01)

(58) Field of Classification Search
None
See application file for complete search history.

(56) References Cited

U.S. PATENT DOCUMENTS

| 6,445,521 | B1 * | 9/2002 | Schaff et al. .................... 360/31 |
| 7,212,361 | B1 | 5/2007 | Pederson et al. |
| 7,982,995 | B2 | 7/2011 | Chung et al. |
| 8,009,379 | B2 | 8/2011 | Williams |
| 2005/0143946 | A1 | 6/2005 | Gururangan et al. |
| 2012/0281304 | A1 * | 11/2012 | Jin et al. ........................ 360/31 |

* cited by examiner

*Primary Examiner* — Daniell L Negron

(57) ABSTRACT

A data storage device with compensation for coercivity variations in a magnetic disk storage medium is disclosed. Two procedures are executed to perform the coercivity compensation. In a first procedure, typically performed prior to writing of data, the coercivity at a number of locations on the disk is measured and stored. A second procedure writes data to locations on a magnetic disk storage medium having varying coercivities. To maintain writing widths within predefined limits, a writing parameter is varied according to a predetermined relationship between the value of the writing parameter and the coercivity. Choices of writing parameter comprise the writing current and fly height. The method may be employed for both data writing and self-servo writing of servo patterns.

19 Claims, 16 Drawing Sheets

WRITE CURRENT AND FLY HEIGHT ADJUSTMENT FOR COMPENSATING MEDIA COERCIVITY VARIATION

TECHNICAL FIELD OF THE INVENTION

The present invention relates to data storage devices, and in particular to data storage devices employing magnetic media with spatial coercivity variations.

BACKGROUND OF THE INVENTION

The present invention relates to data storage devices employing magnetic disk data storage media. These media have a layered structure 800 as depicted schematically in FIG. 8, where physical vapor deposition (PVD, or "sputtering") or another thin-film deposition process may be used to first deposit a magnetic layer 806 with a thickness 816 onto a disk substrate 808, typically made of glass or aluminum. Next, a protective layer 804 having a thickness 814 is deposited on top of the magnetic layer 806—the purpose of protective layer 804 is to prevent oxidation of magnetic layer 806 which could adversely impact the magnetic properties. Finally, a lubricating layer 802 with a thickness 812 is deposited on top of the protective layer 804—lubricating layer 802 protects both the disk and magnetic head (not shown) from damage due to contact with the head slider during disk operation. The spacing between the read/write head contained in an air bearing slider (ABS) and the top surface of the lubricating layer is called the "fly height" (FH) and may be controlled by both aerodynamic factors and thermal fly height control (TFC) as is well known. Note that the actual distance between the read/write heads and the magnetic layer 806 also includes the thicknesses 812 and 814 of lubricating layer 802 and protective layer 804, respectively. Thus variations in the thicknesses of layers 802 and 804 may affect the magnetic writing process which strongly depends on the distance between the read/write head and magnetic layer 806. In addition, magnetic layer 806 may also vary in thickness and magnetic properties as a function of location (radial and azimuthal, roughly equivalent to track and sector) on the disk storage medium due to inevitable process variations during deposition. These variations in the magnetic properties of layer 806 are comprised in the "coercivity", defined as the reverse field needed to drive the magnetization to zero after the magnetic material has been saturated—the current in the write head required to generate this reverse field is called the "coercive current". Generally, in order to write a bit of information, a higher, "writing" current will be required to drive the magnetic medium to saturation in the opposite direction—the magnetic flux density needed for writing may be termed the "writing flux density". The ratio of the writing current to the coercive current is commonly assumed to be constant, often with the notation "k". Since this ratio is generally assumed to be constant (in the absence of saturation within the write head magnetic circuit), variations in coercivity induce proportional changes in the required writing currents—if the writing current is not changed in response to coercivity variations, the pattern of magnetization may vary, potentially adversely affecting writing widths. The magnetic field at the magnetic layer 806 is controlled by a number of factors including the writing current, $I_w$, and the "fly height", FH.

It is typically found that variations in coercivity are relatively "smooth", i.e., varying over distances of several mm on disks with diameters of a few tens of mm. FIG. 4 schematically illustrates the lowest spatial frequency coercivity variation in a plan view 400 of a disk storage medium—this variation is called "1F", corresponding to one side 402 of the disk having higher coercivity than the opposite side 406. The origin of the term "1F" is that with this pattern of coercivity variation, the resulting electronic frequency when the disk storage medium is rotating corresponds to the fundamental rotational frequency of the disk, e.g., a 6000 rpm rotation of disk 400 (corresponding to 100 rps) would generate a 100 Hz signal (the frequency "F"). Region 402 with darker shading represents a higher coercivity than region 406 (lighter shading) 180° azimuthally around the disk. Regions 404 and 408 have intermediate coercivities, lower than region 402, but higher than region 406. The coercivity across the disk 400 will vary gradually between the higher and lower values in regions 402 and 406, respectively. Typical magnitudes of the coercivity variation are a few percent (see FIG. 9).

FIG. 5 is a schematic plan view of disk storage medium 500 with a 2F variation in coercivity—in this example, regions 502 and 506 have higher coercivities, while regions 504 and 508 have lower coercivities. Because the coercivity goes through two maxima and two minima azimuthally around the disk, this is termed a "2F" variation, since for a 6000 rpm rotation of disk 500 (100 rps), the resultant electronic frequency would be 200 Hz.

FIG. 6 is a schematic plan view of disk storage medium 600 with a 3F variation in coercivity—in this example, regions 602, 606 and 610 have higher coercivities, while regions 604, 608 and 612 have lower coercivities. Because the coercivity goes through three maxima and three minima azimuthally around the disk, this is termed a "3F" variation, since for a 6000 rpm rotation of disk 600, the resultant electronic frequency would be 300 Hz.

FIG. 7 is a schematic graph 700 of the coercivity 704 as a function of the azimuthal angle (i.e., angle around the circumference) 702 on a disk storage medium for the three examples in FIGS. 4-6. Curves 706, 708, and 710 correspond to FIGS. 4-6, respectively. These are schematic sinusoidal curves which can be compared with actual measured coercivity data in FIG. 9 corresponding to a 2F disk (FIG. 5).

FIG. 1 is a schematic cutaway diagram of a write head 102 (the surrounding air bearing slider structure has been omitted for clarity) and a region 108 of a storage medium where the coercivity is nominal. Flux lines 104 and 106 emerge from head 102 and enter disk 108. The flux density is approximately proportional to the writing current (in the absence of saturation in the magnetic circuit of the write head) and approximately inversely to the fly height. In general, the flux density 106 near the center of head 102 will be higher than the flux density 104 nearer the edges of head 102. Where the flux density is above the writing flux density, medium 108 will be magnetized to produce track 110 with writing width (WW) 112. Outside track 110, flux 104 is below the writing flux density and the magnetic material will not be sufficiently magnetized to record data. FIG. 1 illustrates the nominal writing width 112, resulting from region 108 having the nominal coercivity.

FIG. 2 is a schematic cutaway diagram of the write head 102 as in FIG. 1 and a region 208 of a storage medium where the coercivity is below the nominal value. In this example, where the present invention is not employed, there has been no change to either the writing current or the fly height, thus the distribution of flux lines is essentially unchanged from FIG. 1. However, since the coercivity is lower here, it is "easier" (i.e., the writing flux density, which is proportional to the coercivity, is also lower) to magnetize medium 208 than medium 108 (signified here by wider spacings of the shading lines), thus writing width 212 extends outwards farther on each side into regions where the magnetic flux density from head 102 was too low to magnetize medium 108 in FIG. 1, but is now adequate to magnetize medium 208. As a result, the width 212 of track 210 may be larger than the width 112 of track 110 in FIG. 1.

FIG. 3 is a schematic cutaway diagram of the write head 102 as in FIGS. 1 and 2 and a region 308 of a storage medium where the coercivity is above the nominal value—this represents the opposite situation from FIG. 2, since now medium 308 is more difficult (i.e., the writing flux density, which is proportional to the coercivity, is higher) to magnetize than medium 108 (signified here by narrower spacings of the shading lines). Again, compared with FIG. 1, there has been no change to the flux distribution from head 102, but because it takes a higher magnetic flux density to magnetize medium 308 than medium 108, the width 312 of track 310 may be smaller than the width 112 of track 110 in FIG. 1.

Various methods have been proposed to deal with variations in the coercivities within magnetic storage media. In U.S. Pat. No. 8,009,379 B2, during the writing process the ambient temperature within the disk drive is monitored. Temperature variations can affect the writing process in at least two ways: 1) by affecting the air density directly above the disk surface, the fly height may change due to aerodynamic factors, and 2) the coercivity typically decreases with an increase in temperature. Given the measured temperature, the writing current is varied in a step-wise fashion in an attempt to match the writing current to the writing parameters such as fly height and/or coercivity. No attempt is made to map spatial variations of coercivity across the disk medium to correct for process variations—instead, the average coercivity of the disk at nominal room temperature is determined, and this coercivity is then corrected for temperature fluctuations, either above or below room temperature. Another writing parameter monitored in U.S. Pat. No. 8,009,379 B2 is the degree of "overwrite", which is a measure of how much residual data remains from any previous writing on an area of the disk—generally it is undesirable to write excessively "hard" (thereby eliminating all residual data), so that a small amount of residual information is preferred. No measurement of the spatial distribution of coercivity on the disk medium is performed prior to writing in the method of this patent, thus undesirable time "overheads" may occur due to the requirement for real-time process parameter monitoring during writing.

In U.S. Pat. No. 6,445,521 B1, a test pattern is written using a plurality of writing currents. The bit error rates (BER) are then measured with the read head intentionally offset from the center of the track where the data is to be stored. The procedure outlined here is laborious, requiring large numbers (e.g., 32) of error rate measurements for each track in order as well as writing operations for noise (with the write head offset) and test patterns (with the head at the nominal track center).

U.S. Pat. No. 7,982,995 B2 discloses an approach for compensating the effects of thermal coercivity variations. The coercivity distribution of a disk storage medium is first mapped by writing data into spots distributed radially and azimuthally across the surface of the disk medium. The writing parameters are then optimized for a nominal room temperature. During writing operations, if the ambient temperature of the storage device is near room temperature, then data may be written at random locations (i.e., anywhere) on the disk medium. Conversely, if the ambient temperature exceeds the nominal room temperature, data may only be written in areas of the disk with higher coercivities when measured at the nominal room temperature. If the ambient temperature is below the nominal room temperature, the opposite procedure is followed and data may only be written in areas having low coercivities when measured at the nominal room temperature. Thus, instead of compensating the writing process for temperature-induced coercivity variations, this method "seeks out" regions whose coercivity will have undergone a thermally-induced change in a direction matching the requirements of a fixed writing process. Obviously, this method may limit writing amounts or speeds, since it imposes undesirable limits to which areas of the disk medium are usable in any particular operational environment.

Given that we have seen that some variation, at least at the few percent level, in the coercivity of the disk storage medium is inevitable, and also given that this variation in coercivity may have deleterious effects on the writing widths of tracks on the disk, it would be advantageous to reduce or eliminate these effects.

It would be advantageous if this control method could be implemented without requiring changes to the physical structure of the read/write head or the arm electronics (AE) which position the read/write head relative to the rotating disk storage medium.

SUMMARY OF THE INVENTION

Aspects of the present invention provide a method for improved data storage in a hard disk drive or other data storage device employing a rotating magnetic disk storage medium.

In some embodiments, the writing current may be adjusted to maintain the writing width within predefined limits.

In some embodiments, the fly height may be adjusted to maintain the writing width within predefined limits.

In some embodiments, both the writing current and the fly height may be adjusted, either simultaneously or alternatively, to maintain the writing width within predefined limits.

In some embodiments, an array of measurement locations $(R,\theta)$ comprising radial $(R)$ and azimuthal $(\theta)$ coordinates on a disk storage medium at which locations the coercivity is to be measured may be predefined.

In some embodiments, the coercivity at an array of predefined measurement locations $(R,\theta)$ on a disk storage medium may be measured and stored in an array, $H_c(R,\theta)$.

In some embodiments, the writing current, $I_w$, required to maintain the writing width within predefined limits as a function of the coercivity of a disk storage medium may be measured and stored in an array, $I_w(H_c)$.

In some embodiments, the writing current required to maintain the writing width within predefined limits may be assumed to be proportional to the coercivity.

In some embodiments, the fly height, FH, required to maintain the writing width within predefined limits as a function of the coercivity of the disk storage medium may be measured and stored in an array, $FH(H_c)$.

In some embodiments, the fly height, FH, required to maintain the writing width within predefined limits may be assumed to be inversely proportional to the coercivity.

In some embodiments, the fly height, FH, may be varied by thermal fly height control.

In some embodiments, a writing location $(R_D,\theta_D)$ for storing data on a disk storage medium may be compared with an array of measurement locations $(R,\theta)$ where the coercivity $H_c(R,\theta)$ has previously been measured, where the nearest location in the $(R,\theta)$ array to $(R_D,\theta_D)$ is designated $(R_N,\theta_N)$. The coercivity $H_c(R_N,\theta_N)$ at location $(R_N,\theta_N)$ is defined as the writing coercivity at the location $(R_D,\theta_D)$.

In some embodiments, the writing coercivity is used to adjust the writing current to maintain the writing width within predefined limits when writing data at writing location ($R_D$, $\theta_D$).

In some embodiments, the writing coercivity is used to adjust the fly height to maintain the writing width within predefined limits when writing data at writing location ($R_D$, $\theta_D$).

DETAILED DESCRIPTION

Embodiments of the invention can provide one or more advantages over writing methods employing fixed writing currents and/or fixed fly heights independent of the coercivity of the disk storage medium. Not all embodiments may provide all the benefits.

Measured Coercivity Variations in Disk Storage Media

Figure 4:
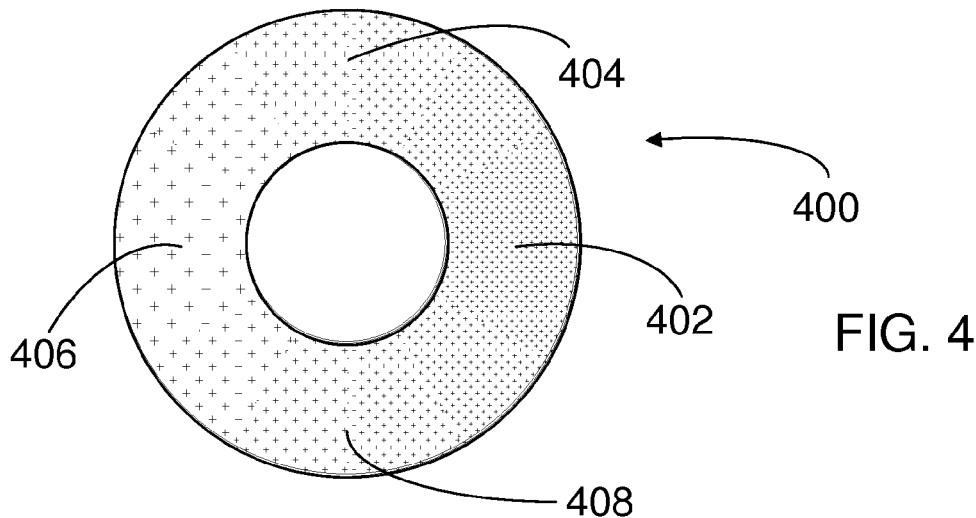
FIG. 4 is a schematic plan view of a disk storage medium with a 1F variation in coercivity.
Figure 5:
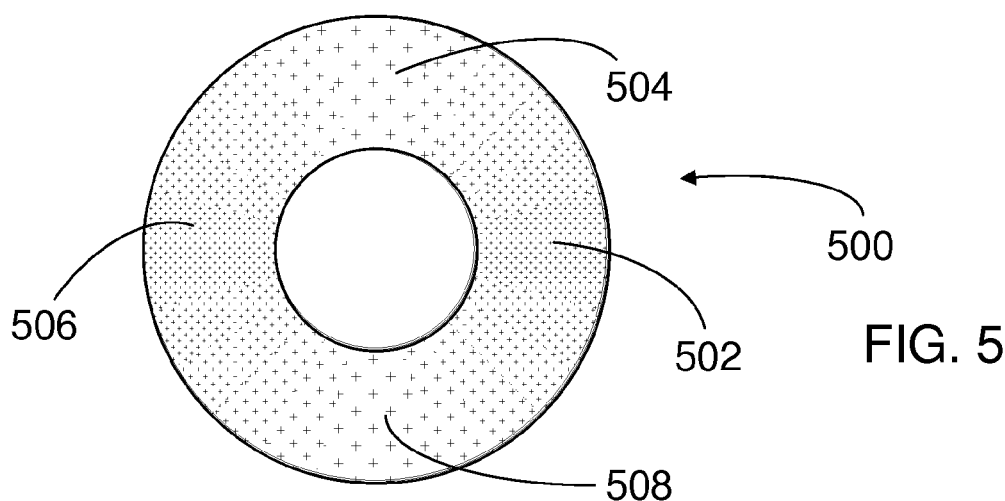
FIG. 5 is a schematic plan view of a disk storage medium with a 2F variation in coercivity.
Figure 6:
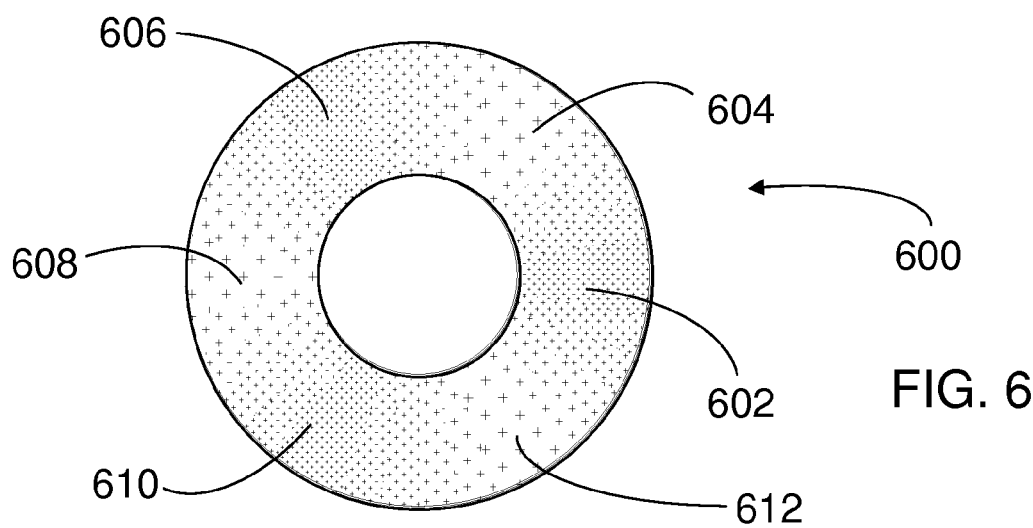
FIG. 6 is a schematic plan view of a disk storage medium with a 3F variation in coercivity.
Figure 7:
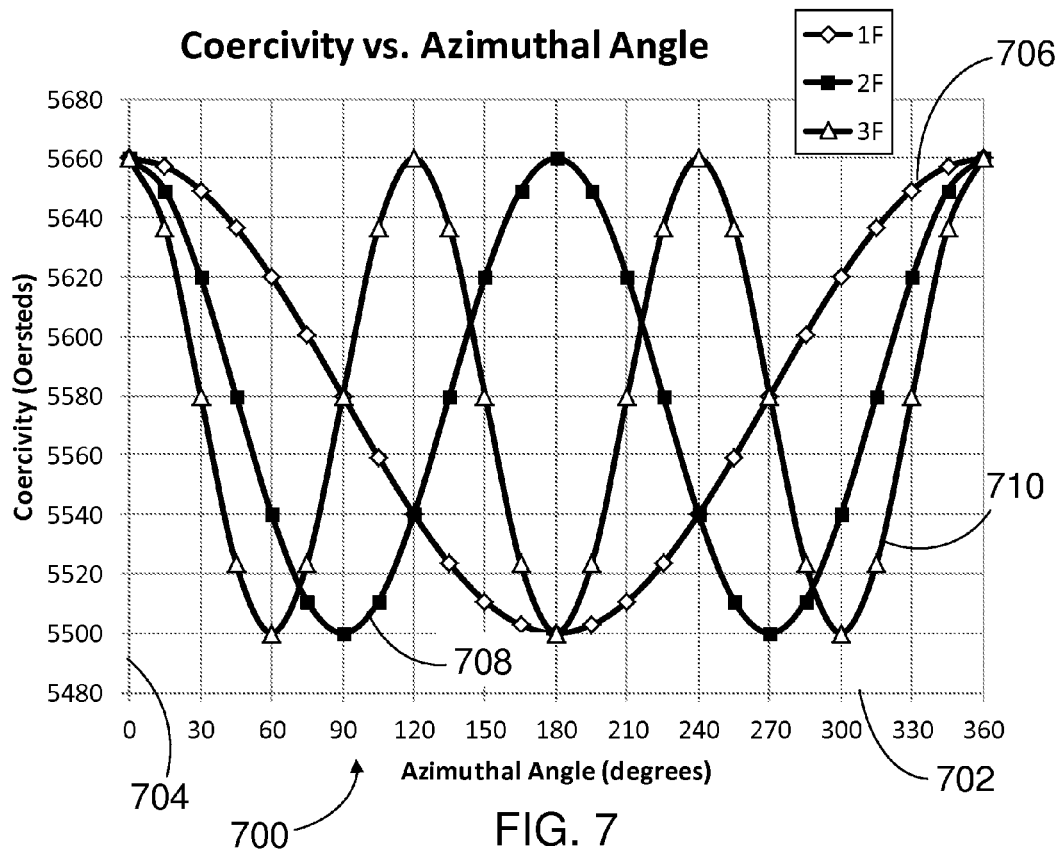
FIG. 7 is a schematic graph of the coercivity as a function of the azimuthal angle for the three storage media in FIGS. 4-6.
Figure 8:
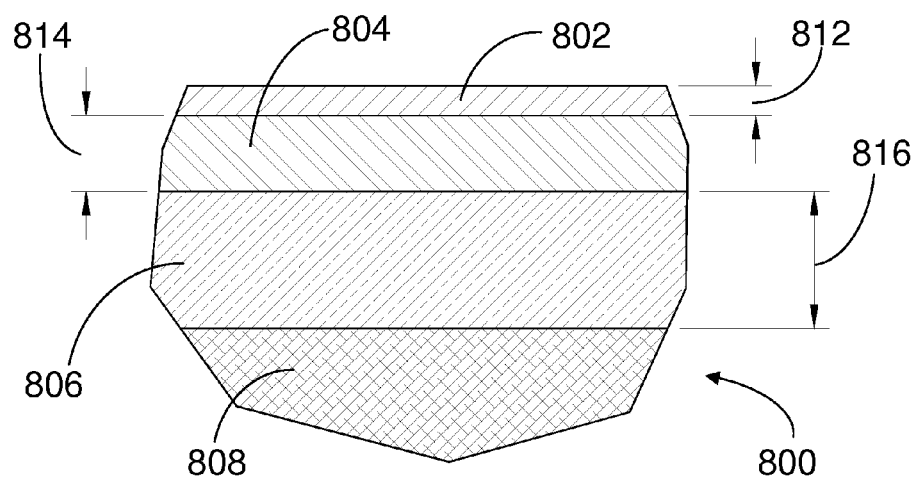
FIG. 8 is a schematic cutaway diagram of a disk storage medium.
Figure 9:
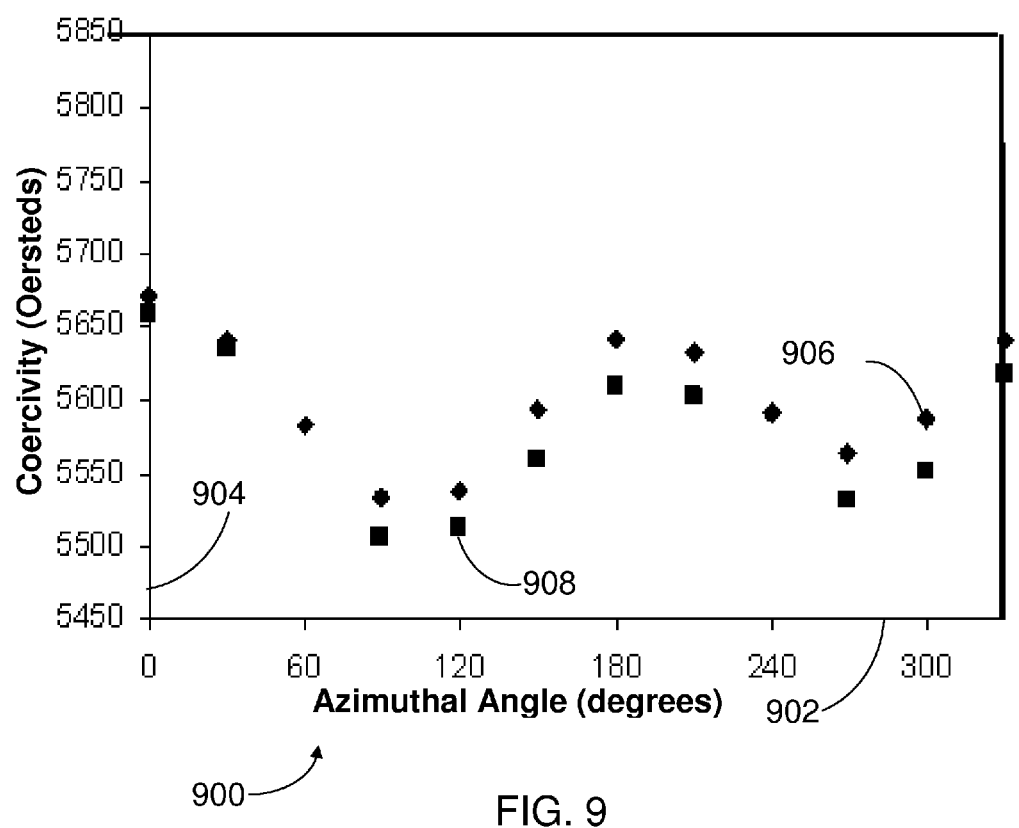
FIG. 9 is a graph of measured coercivity data from a disk storage medium.

FIG. 9 is a graph 900 of measured coercivity data 904 relative to azimuthal angle 902 for a disk storage medium—this can be compared with the schematic graph in FIG. 7. Two sets of data points, each spaced at 30° intervals around the circumference, are shown—points 906 correspond to an intermediate diameter between the inner diameter (I.D.) and outer diameter (O.D.) of the disk, while points 908 were measured near the O.D. of the disk. Comparison with curve 708 in FIG. 7 shows that the data here correspond to the "2F" coercivity pattern in FIG. 5. Note that there is little radial variation in the coercivity, compared with the azimuthal variation. This is to be expected based on the overall gradual spatial variations in coercivity arising from any thin-film deposition process, as shown schematically in FIGS. 4-6. The magnitude of the azimuthal coercivity variation is about ±75 Oersteds around a mean coercivity of 5580 Oersteds—this corresponds to ±1.35%, for an overall range of 2.7%.

Figure 2:
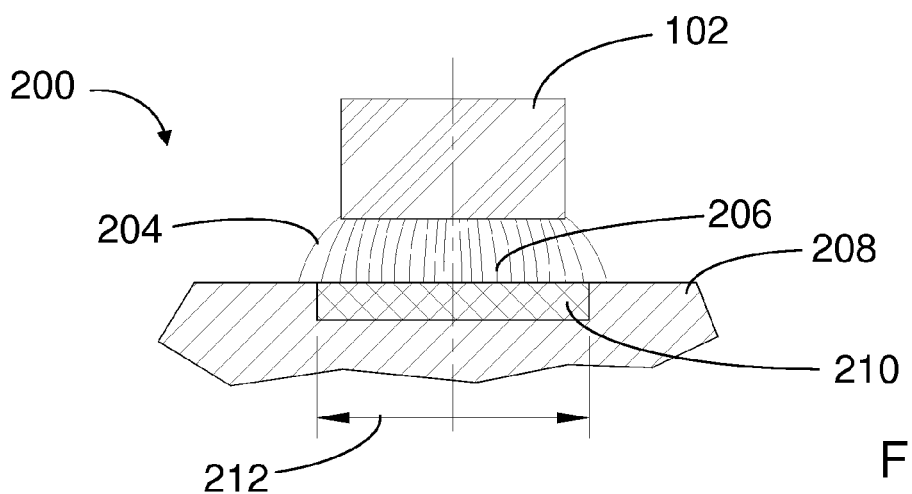
FIG. 2 is a schematic cutaway diagram of a write head and a portion of a storage medium where the coercivity is below the nominal value.
Figure 3:
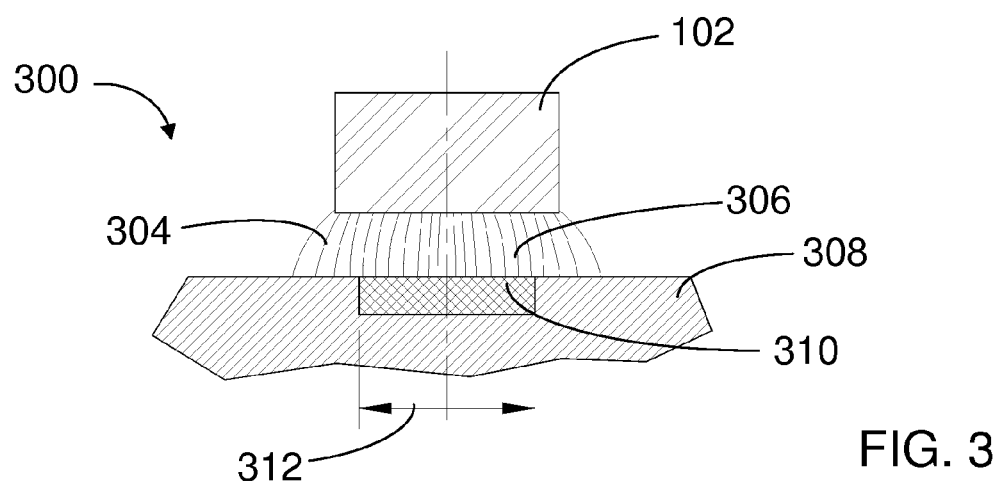
FIG. 3 is a schematic cutaway diagram of a write head and a portion of a storage medium where the coercivity is above the nominal value.
Figure 10:
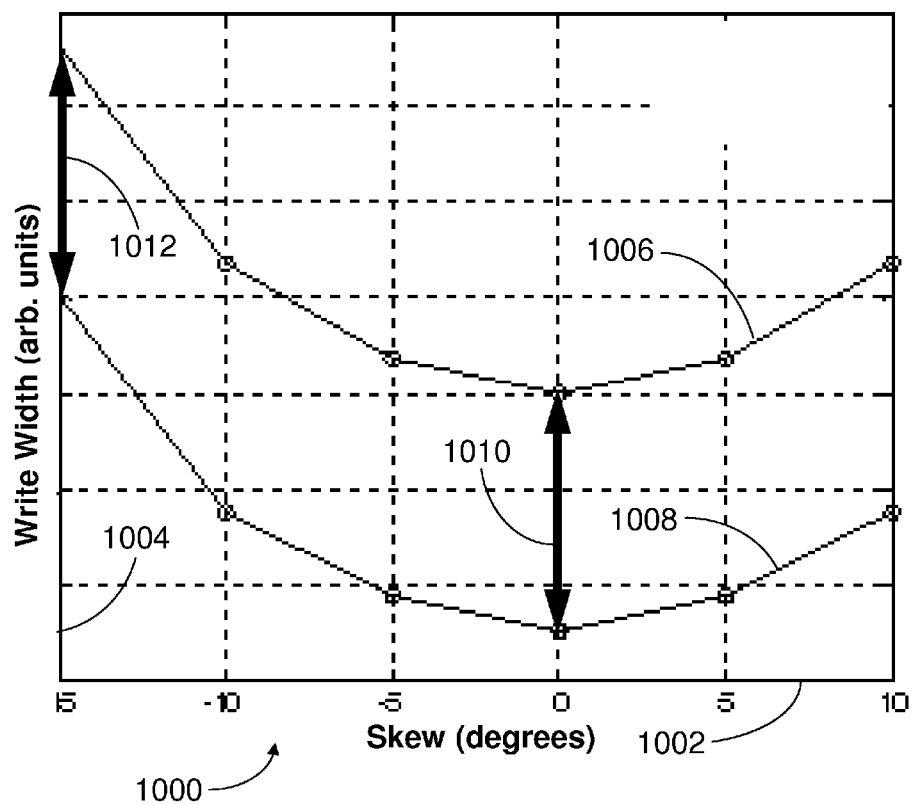
FIG. 10 is a graph of variation in write width with skew angle.

FIG. 10 is a graph 1000 of variation in write width 1004 (shown in arbitrary units) with skew angle 1002 for two regions having different coercivities: curve 1006 at 5500 Oersteds and curve 1008 at 5650 Oersteds—as expected for the lower coercivity, the writing width is slightly larger as illustrated in FIG. 2. Arrow 1010 shows the change in write width for zero skew (0°), a skew angle corresponding to tracks mid-way between the I.D. and O.D. of the disk where the arm extends roughly tangent to the tracks being read and/or written. The length of arrow 1010 is essentially the same as the length of arrow 1012, corresponding to a skew of −15°. Over the entire range of skew from −15° to +10° there is essentially no variation in the difference between the writing widths for the two coercivities shown by curves 1006 and 1008—the significance of this almost uniform difference is that any method for compensating for coercivity variations between different regions of the disk storage medium will work for all tracks across radius of the disk, from the I.D. out to the O.D., independent of skew angle. The effect of the correction method of the present invention is to move curves 1006 and 1008 to be coincident with each other at 0° skew—the equal spacing between curves 1006 and 1008 means that if the curves are made coincident at 0° skew, they will simultaneously become approximately coincident (i.e., overlapping) at all other skew angles 1002 from −15° to +10° as well.

Write Current Adjustment to Compensate Media Coercivity Variation

Figure 1:
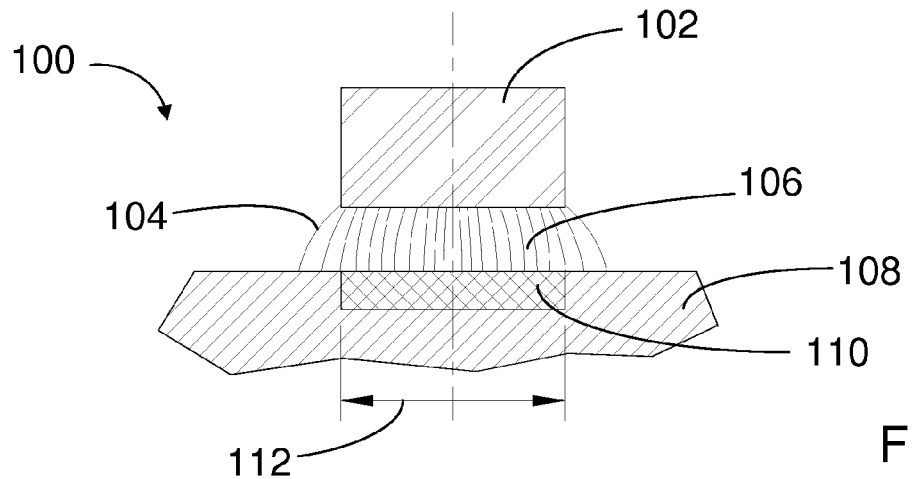
FIG. 1 is a schematic cutaway diagram of a write head and a portion of a storage medium where the coercivity is at a nominal value.
Figure 11:
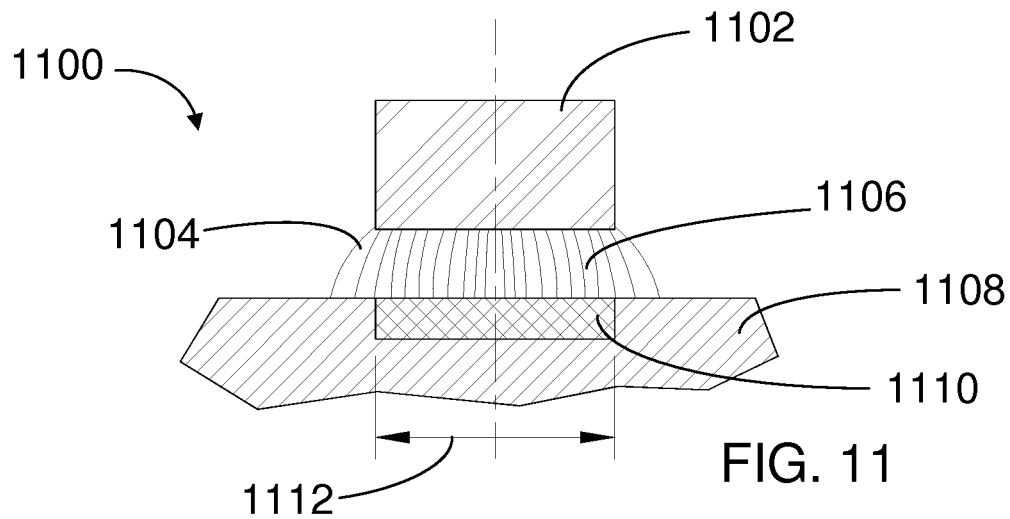
FIG. 11 is a schematic cutaway diagram of a write head and a portion of a storage medium where the coercivity is at a nominal value according to a first embodiment of the present invention.
Figure 12:
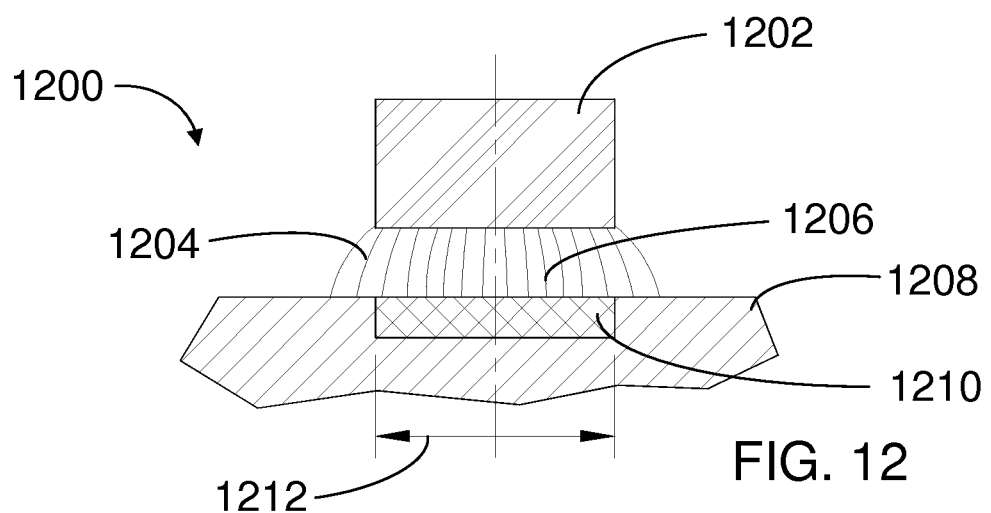
FIG. 12 is a schematic cutaway diagram of a write head and a portion of a storage medium where the coercivity is below the nominal value according to a first embodiment of the present invention.
Figure 13:
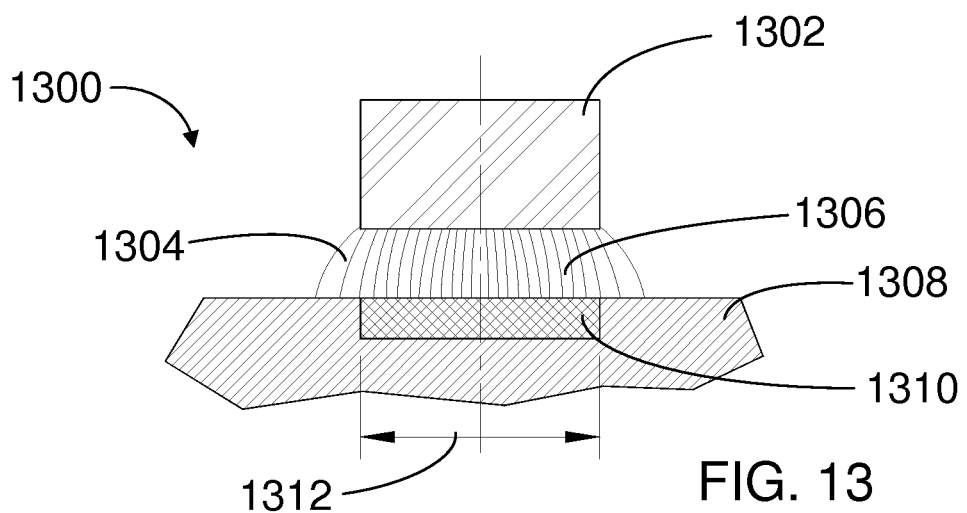
FIG. 13 is a schematic cutaway diagram of a write head and a portion of a storage medium where the coercivity is above the nominal value according to a first embodiment of the present invention.

FIG. 11 is a schematic cutaway diagram 1100 of a write head 1102 (the surrounding air bearing slider structure has been omitted for clarity) and a region 1108 of a storage medium where the coercivity is nominal according to a first embodiment of the present invention. FIG. 11 corresponds to FIG. 1 since when the coercivity is nominal, the write current will also be set to its nominal value. Some benefits of the present invention are illustrated in FIGS. 12 and 13 for the case of adjustment of the writing current to control the writing width when the coercivity is not nominal. Flux lines 1104 and 1106 emerge from head 1102 and enter disk 1108. The flux density is proportional to the writing current and also depends on the fly height (although not linearly). In general, the flux density will be somewhat higher near the center (flux lines 1106), compared with the flux density 1104 nearer the edges of head 1102. Flux density 1106 is above the writing flux density (see the Background section for the definition of "writing flux density"), thus medium 1108 will be magnetized to produce track 1110 with writing width (WW) 1112. Outside track 1110, flux density 1104 is below the writing flux density and medium 1108 is not sufficiently magnetized to record data. FIG. 11 illustrates the nominal writing width 1112 resulting from the nominal coercivity of this region 1108 of the disk.

FIG. 12 is a schematic cutaway diagram 1200 of a write head 1202 and a region 1208 of a storage medium where the coercivity is below the nominal value according to a first embodiment of the present invention. FIG. 12 can be compared with FIG. 2, where as a result of the lower coercivity in region 208, the writing width 212 was larger than desired. Here, according to a first embodiment of the invention, the writing current has been reduced by a controlled amount (see flowcharts 2400 and 2500) with the result that flux densities 1204 and 1206 are less than flux densities 1104 and 1106, respectively. The total flux and the flux densities are essentially proportional to the writing current. Because flux densities 1204 and 1206 are reduced, writing width 1212 may be adjusted to match the nominal writing width 1112—i.e., the writing width has been maintained unchanged even though the head has moved from a region 1108 with nominal coercivity to another region 1208 with lower coercivity.

FIG. 13 is a schematic cutaway diagram 1300 of a write head 1301 and a region 1308 of a storage medium where the coercivity is above the nominal value according to a first embodiment of the present invention. Here the situation is basically the opposite of FIG. 12 compared with FIG. 11—the higher coercivity in region 1308 requires an increased writing current (i.e., a larger writing flux density) to maintain track 1310 at the same writing width 1312 as track 1110 (with width 1112). Both fluxes 1304 and 1306 are higher than fluxes 1104 and 1106 by a controlled amount (see flowcharts 2400 and 1500).

Fly Height Adjustment to Compensate Media Coercivity Variation

Figure 14:
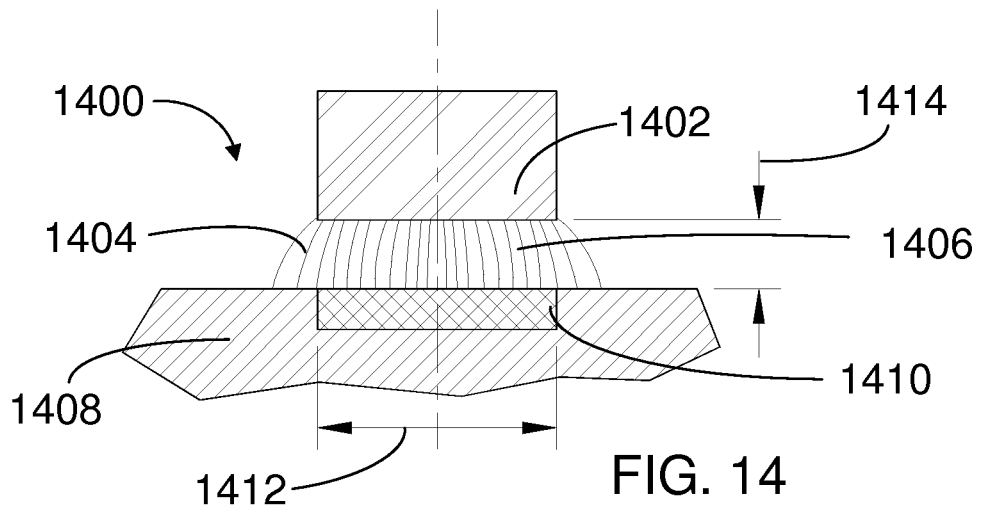
FIG. 14 is a schematic cutaway diagram of a write head and a portion of a storage medium where the coercivity is at a nominal value according to a second embodiment of the present invention.
Figure 15:
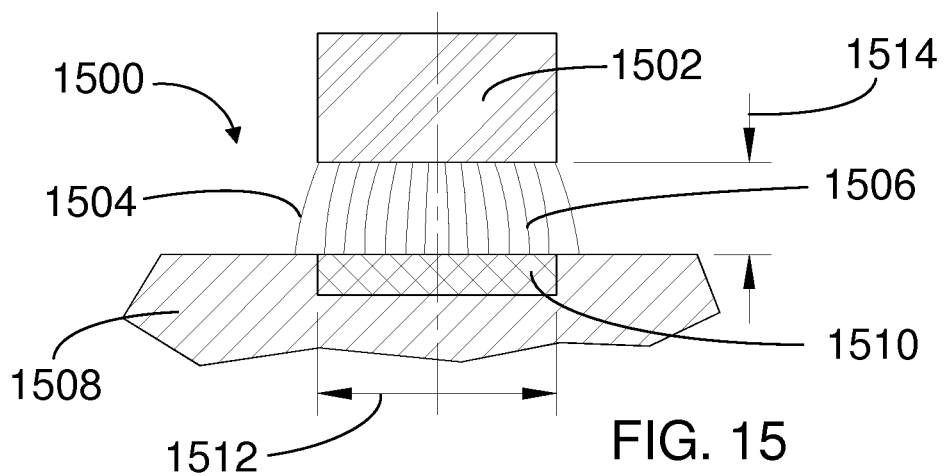
FIG. 15 is a schematic cutaway diagram of a write head and a portion of a storage medium where the coercivity is below the nominal value according to a second embodiment of the present invention.
Figure 16:
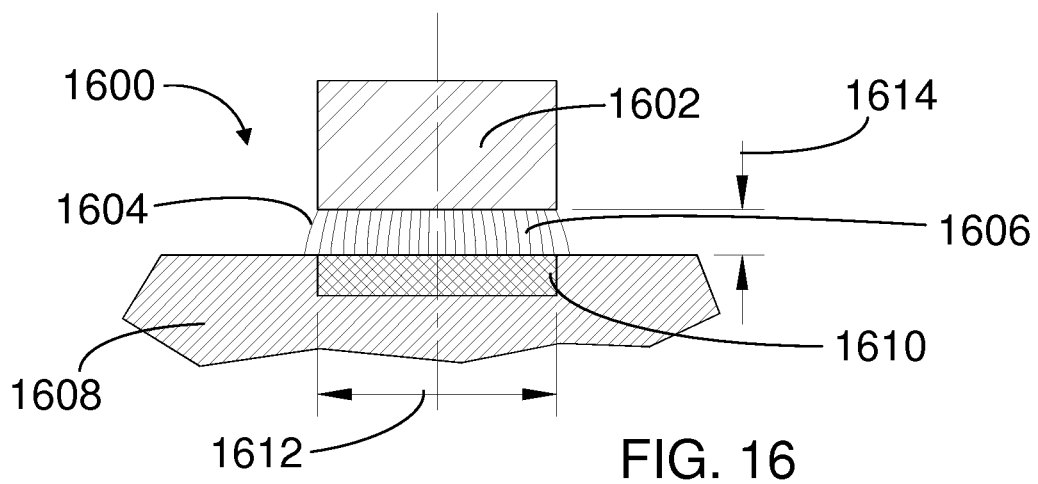
FIG. 16 is a schematic cutaway diagram of a write head and a portion of a storage medium where the coercivity is above the nominal value according to a second embodiment of the present invention.

FIG. 14 is a schematic cutaway diagram 1400 of a write head 1402 (the surrounding air bearing slider structure has been omitted for clarity) and a region 1408 of a storage medium where the coercivity is nominal according to a second embodiment of the present invention. This figure can be compared with FIGS. 1 and 11, since when the coercivity is nominal, the fly height 1414 will also be set to its nominal value, in some cases using thermal fly height control (TFC). Some benefits of the present invention are illustrated in FIGS. 15 and 16 for the case of adjustment of the fly height to control the writing width when the coercivity is not nominal. Flux lines 1404 and 1406 emerge from head 1402 and enter disk 1408. Flux density 1406 is above the writing flux density, thus medium 1408 will be magnetized to produce track 1410 with writing width (WW) 1412. Outside track 1410, flux density 1404 is below the writing flux density and medium 1408 is not sufficiently magnetized to record data. FIG. 14 illustrates the nominal writing width 1412 (the same as width 112 in FIG. 1 and width 1112 in FIG. 11) resulting from the nominal coercivity of this region 1408 of the disk.

FIG. 15 is a schematic cutaway diagram 1500 of a write head 1502 and a region 1508 of a storage medium where the coercivity is below the nominal value according to a second embodiment of the present invention. FIG. 15 can be compared with FIG. 2, where as a result of the lower coercivity in region 208, the writing width 212 was larger than desired. Here, according to a second embodiment of the invention, the fly height 1514 has been increased (in some embodiments by thermal fly height control) by a controlled amount (see flowchart 2400) with the result that flux densities 1504 and 1506 are less than flux densities 1404 and 1406, respectively. Although flux densities 1504 and 1506 are reduced, the total flux should remain the same as in FIG. 14 (assuming the writing current remains unchanged), however the increased fly height 1514 compared with height 1414 allows the flux to spread out more, thereby reducing the flux density at medium 1508. Because flux densities 1504 and 1506 are reduced (corresponding to the required decrease in writing flux density), writing width 1512 may be adjusted to match the nominal writing width 1412—i.e., the writing width has been maintained unchanged even though the head has moved from a region 1408 with nominal coercivity to another region 1508 with lower coercivity.

FIG. 16 is a schematic cutaway diagram 1600 of a write head 1602 and a region 1608 of a storage medium where the coercivity is above the nominal value according to a second embodiment of the present invention. Here the situation is basically the opposite of FIG. 15 compared with FIG. 14—the higher coercivity in region 1608 requires a decreased fly height 1614 (in some embodiments by thermal fly height control) to maintain track 1610 at the same writing width 1612 as track 1410 (with width 1412). Again, as for FIG. 15, the total flux should remain unchanged by the decrease in fly height from FIG. 14 to FIG. 16, however the flux densities 1604 and 1606 are higher because the reduced fly height 1614 concentrates the same total flux into a smaller region across the surface of medium 1608. Both fluxes 1604 and 1606 are higher than fluxes 1404 and 1406 by a controlled amount (see flowcharts 2400 and 2500) corresponding to the required increase in writing flux density.

Adjustment of Both Writing Current and Fly Height to Compensate Media Coercivity Variation In some embodiments, combined application of the methods described in FIGS. 11-13 and in FIGS. 14-16 may be preferred. In some embodiments, the writing current and fly height may be changed simultaneously—this may be beneficial in circumstances where relatively large coercivity variations are found across the disk storage medium and variation of only the writing current or the fly height is inadequate to achieve the required larger change in writing flux density from nominal. In some embodiments, only the writing current may be changed in some instances, while in other instances only the fly height may be changed. In some embodiments, in a first set of instances only the writing current may be changed, in a second set of instances only the fly height may be changed, while in a third set of instances both the writing current and fly height may be changed simultaneously.

Writing Parameters for Embodiments of the Invention

In general, for various embodiments of the present invention, the term "writing parameter" may refer to the writing current, or to the fly height, or to both the writing current and fly height.

Compensation for Media Coercivity Variation

Figure 17:
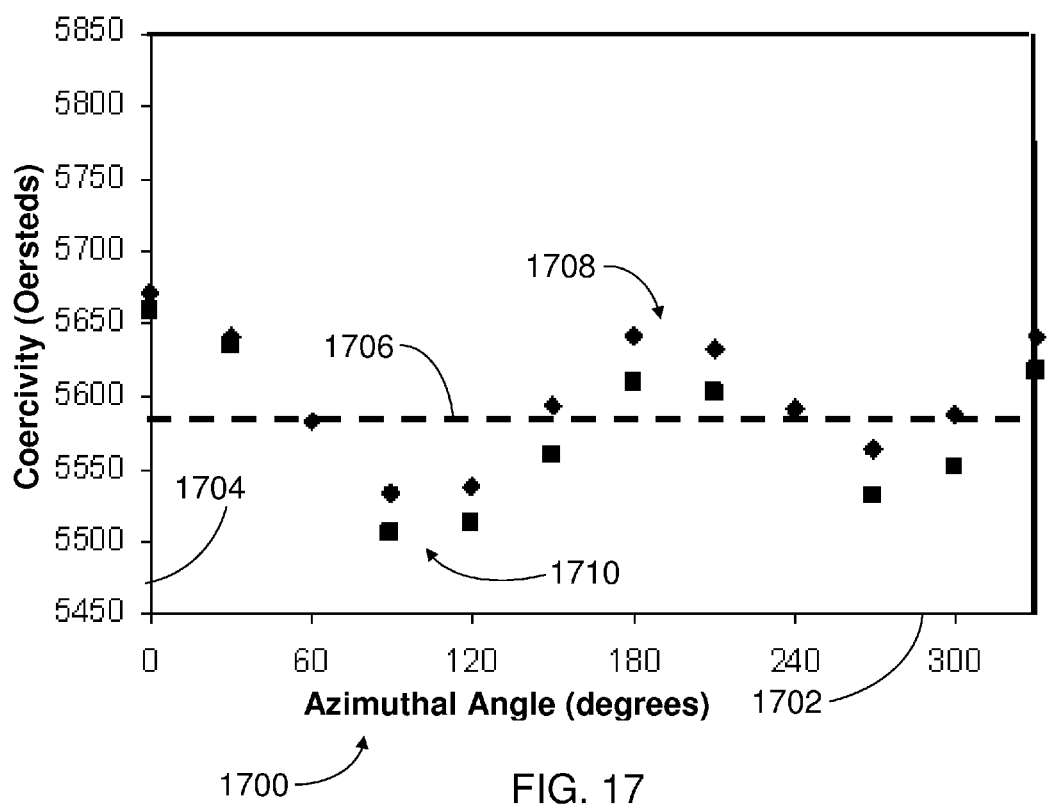
FIG. 17 is a graph of measured coercivity as a function of azimuthal angle at two radii on a disk storage medium.

FIG. 17 is a graph 1700 of measured coercivity 1704 as a function of azimuthal angle 1702 at two radii on a disk storage medium. Dashed line 1706 represents the nominal coercivity, roughly 5580 Oersteds, where the "nominal" coercivity may be defined as the average (mean) coercivity, or the median coercivity, or the average between the maximum and minimum coercivities (as used in this example), or based on a preferred coercivity value corresponding to design aspects of the data storage system, in particular the magnetic circuit of the write head. Region 1708 (starting near 180°) corresponds to higher coerciities (i.e., deviations of coercivity above nominal), where some embodiments of the present invention could either increase the writing current (FIG. 13) and/or decrease the fly height (FIG. 16). Region 1710 (starting near 60°) corresponds to lower coercivities (i.e., deviations of coercivity below nominal), where some embodiments of the present invention could either decrease the writing current (FIG. 12) and/or increase the fly height (FIG. 15).

FIGS. 18-21 correspond to graphs of the probabilities of position error signals (PES) for two neighboring tracks (1 and 2) for regions of the disk storage medium having various coercivities. The desired center of track 1 and the desired center of track 2 are spaced apart by a distance T, 1830, 1930, 2030, and 2130, in FIGS. 18-21, respectively. The vertical axes correspond to the probability of the PES having the values shown along the horizontal axes 1870, 1970, 2070, and 2170 in FIGS. 18-21, respectively. Experimental observations confirm that the PES values are approximately normally-distributed, falling on two Gaussian curves centered on the two track centers. These Gaussian curves are characterized by the standard deviations 1850, 1852, 1950, 1952, 2050, 2052, 2150, and 2152 in FIGS. 18-21.

Figure 18:
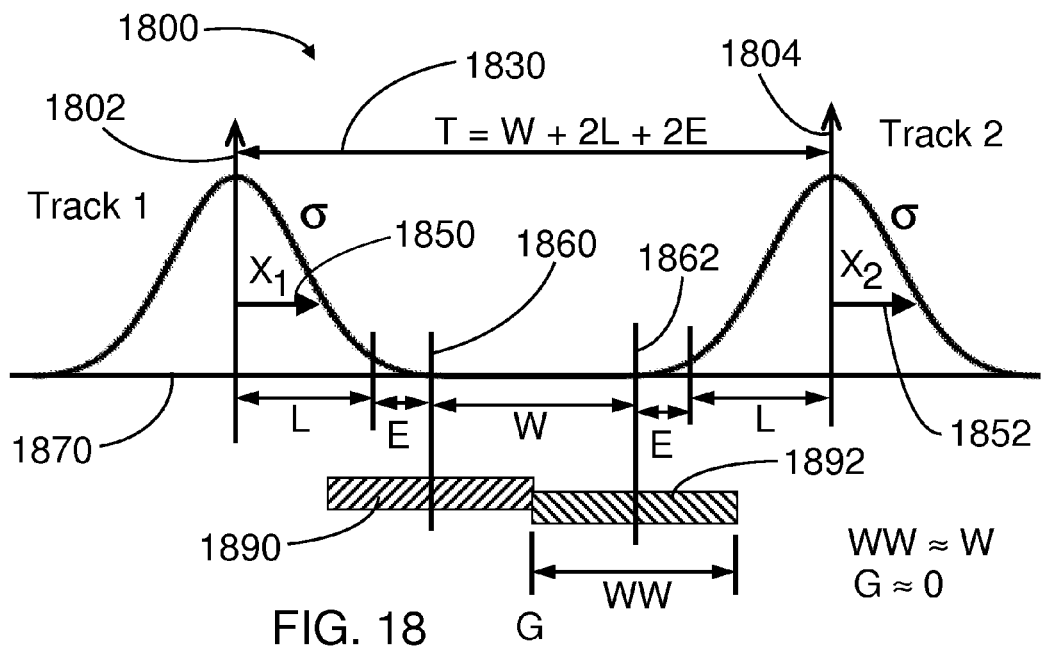
FIG. 18 is a schematic graph of the probabilities of various position error signals for two neighboring tracks for a disk storage medium with the nominal coercivity.

FIG. 18 is a schematic graph 1800 of the probabilities of various position error signals for two neighboring tracks on a region of a disk storage medium. This figure corresponds to: 1) operation of a disk drive not embodying the present invention only when writing regions having nominal coercivity, and 2) operation of a disk drive embodying the present invention when writing regions with varying coercivities. Track 1 is centered at 1802 and track 2 at 1804. The nominal limits for writing extend ±L on each side of centers 1802 and 1804 and an added error margin of ±E is typically added to ensure that the probability of a head excursion of either +(L+E) or −(L+E) is ~$10^{-6}$—these correspond to the limits 1860 and 1862.

The distance between limits 1860 and 1862, W, is determined by, and set equal to, the writing width, WW. The writing width WW is controlled by the writing current, fly height, coercivity and other factors. Bar 1890 illustrates a worst-case writing width and position for a +(L+E) write head excursion (to the far right) while writing track 1. Bar 1892 illustrates a worst-case writing width and position for a −(L+E) write head excursion (to the far left) while writing track 2. The gap, G, between bars 1890 and 1892 is zero. The minimum allowable track-to-track center spacing, W, is set to the nominal writing width WW (i.e., the writing width when the writing current, fly height, and coercivity are all at their nominal values). Thus the minimum allowable track-to-track center spacing corresponds to the case when two tracks just abut, but this condition occurs extremely infrequently due to the normally-distributed PES values. A write inhibit would normally be initiated whenever the PES values exceed ±L to avoid this abutting situation, but noise on the PES readings may lead to the situation illustrated by bars 1890 and 1892. In the absence of PES noise, gap G should always exceed 2E, assuming the writing width WW is nominal (i.e., WW≈W). A purpose of embodiments of the present invention is take corrective actions (i.e., vary the writing current and/or fly height) to maintain WW≈W in situations where variations in the coercivity above or below a nominal value might tend to decrease or increase, respectively, the writing width in the absence of these corrective actions.

Figure 19:
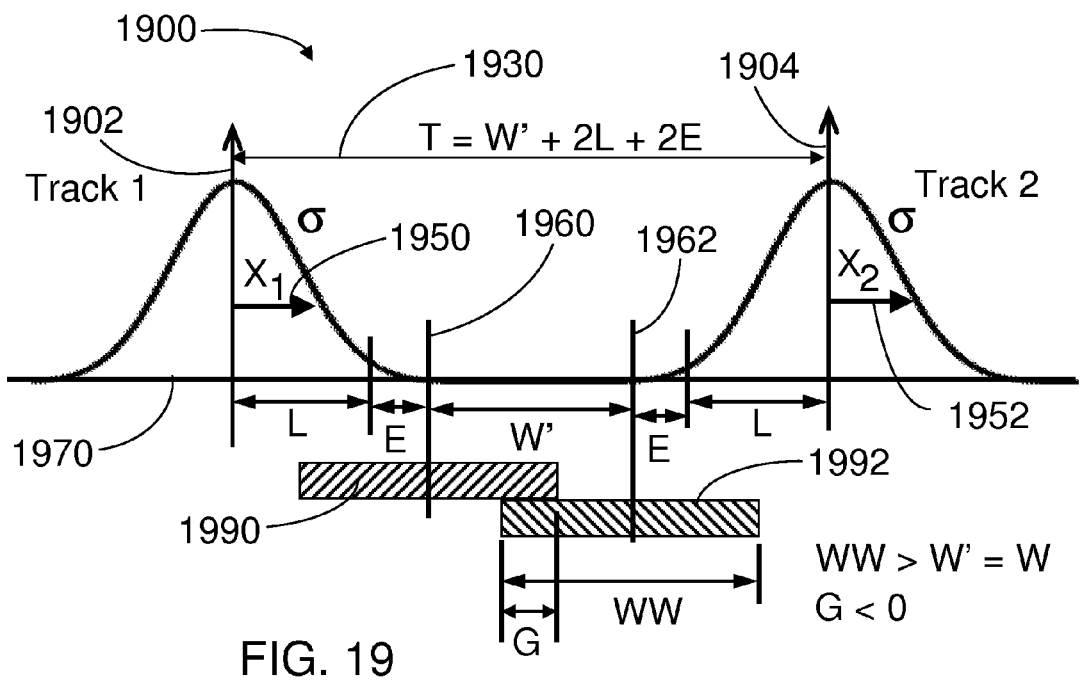
FIG. 19 is a schematic graph of the probabilities of various position error signals for two neighboring tracks for a disk storage medium where the coercivity is below the nominal value.

FIG. 19 is a schematic graph 1900 of the probabilities of various position error signals for two neighboring tracks on a region of a disk storage medium where the coercivity is below the nominal value. Track 1 is centered at 1902 and track 2 at 1904. The writing limits +(L+E) 1960 for track 1 and −(L+E) 1962 for track 2 are spaced apart by the same distance, W'=W, as in FIG. 18. However, since the coercivity is below nominal and there has been no change to either the writing current or the fly height (i.e., the present invention has not been applied here), the writing width WW>W'=W. Because W' has not been increased, we now have "squeeze", and the edges of neighboring tracks are closer than desired because the tracks are wider with the same center-to-center spacing 1930, T=W'+2L+2E. Bars 1990 and 1992 are both wider and now have an overlap, making G<0. This is clearly undesirable since adjacent track overwriting may occur. Although a write inhibit should be triggered at ±L, the overlap G would still not be completely eliminated if WW−W'>2E.

Figure 20:
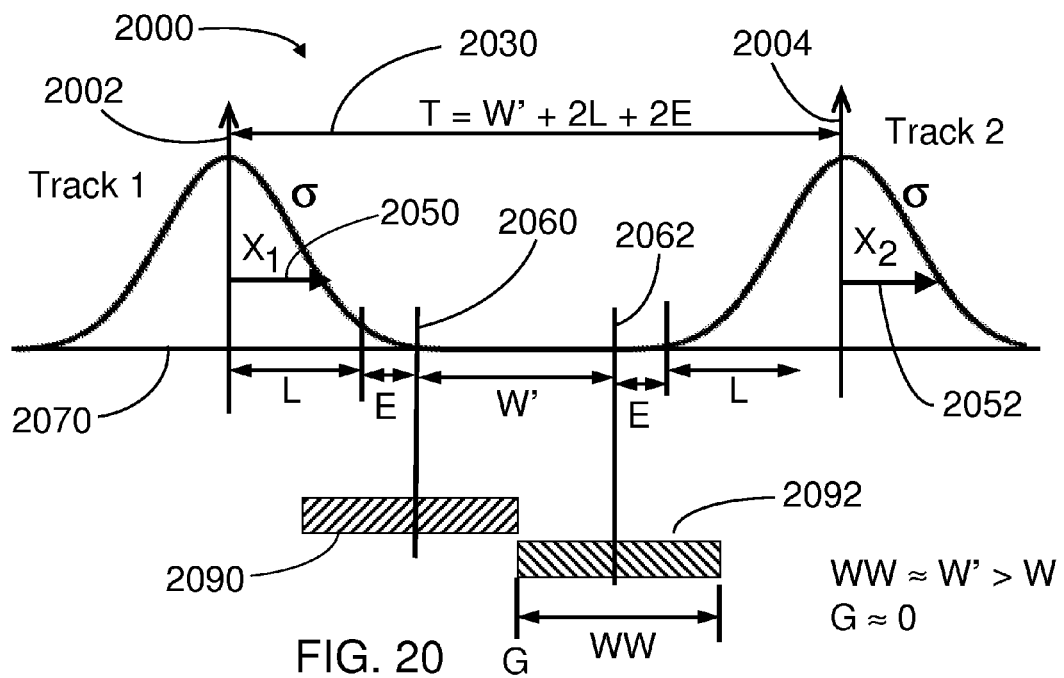
FIG. 20 is a schematic graph of the probabilities of various position error signals for two neighboring tracks for a disk storage medium where the coercivity is below the nominal value with an increased track spacing.

FIG. 20 is a schematic graph 2000 of the probabilities of various position error signals for two neighboring tracks on a region of a disk storage medium where the coercivity is below the nominal value and the track spacing has been increased. Track 1 is centered at 2002 and track 2 at 2004. In order to solve the overlap problem (G<0) illustrated in FIG. 19, the center-to-center track spacing 2030, T=W'+2L+2E has been increased by setting W'≈WW, thereby making W'>W. The writing limits +(L+E) 2060 for track 1 and −(L+E) 2062 for track 2 are spaced apart by a larger distance, W'>W, so that now in all cases where a write inhibit is not generated, G>0. Even in the worst case situation shown where neighboring bars 2090 and 2092 abut, G≈0. If a write inhibit is properly triggered at ±L (i.e., there is minimal noise on the PES), then G>2E. The disadvantage of this conservative approach to dealing with lower coercivities is that the TPI is reduced. The advantages of employing embodiments of the present invention to maintain the writing width WW at the nominal value in FIG. 18 are clear from this illustration. FIG. 18 would apply for lower coercivities with embodiments of the present invention instead of FIG. 21.

Figure 21:
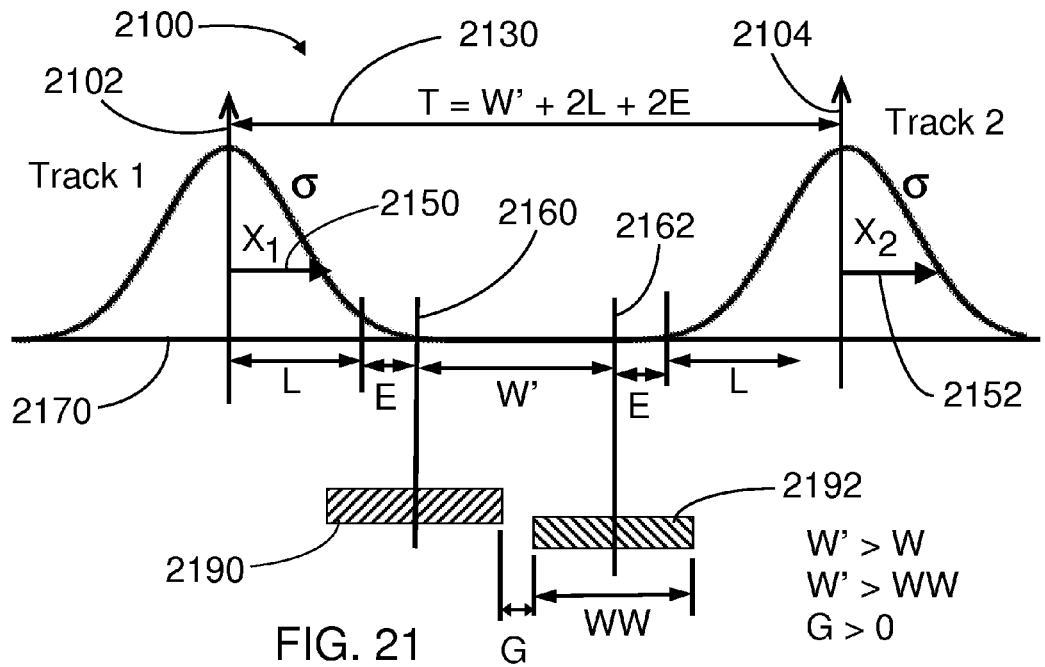
FIG. 21 is a schematic graph of the probabilities of various position error signals for two neighboring tracks for a disk storage medium where the coercivity is above the nominal value with the increased track spacing from FIG. 20.

FIG. 21 is a schematic graph 2100 of the probabilities of various position error signals for two neighboring tracks on a region of a disk storage medium where the coercivity is above the nominal value with the increased track center-to-center spacing from FIG. 20. Track 1 is centered at 2102 and track 2 at 2104. The center-to-center distance 2130, T=W' 2L+2E is the same as distance 2030 in FIG. 20. Because the coercivity is now higher than nominal, the writing width (in the absence of the present invention) is smaller than nominal and gap G>0, while W'>WW. Bars 2190 and 2192 have a larger gap G than is preferred between them even for worst case write head excursions, thus the TPI remains lower than desired (at the same value as in FIG. 20) due to the compromise adopted in making W'>W to avoid the overlaps shown in FIG. 20. The present invention avoids the situation illustrated in FIG. 21 by enabling the center-to-center spacing T 1830 in FIG. 18 to be maintained for all coercivities on the disk storage medium. FIG. 18 would apply for higher coercivities with embodiments of the present invention instead of FIG. 21.

Self-Servo Writing (SSW) of Servo Tracks

Figure 22:
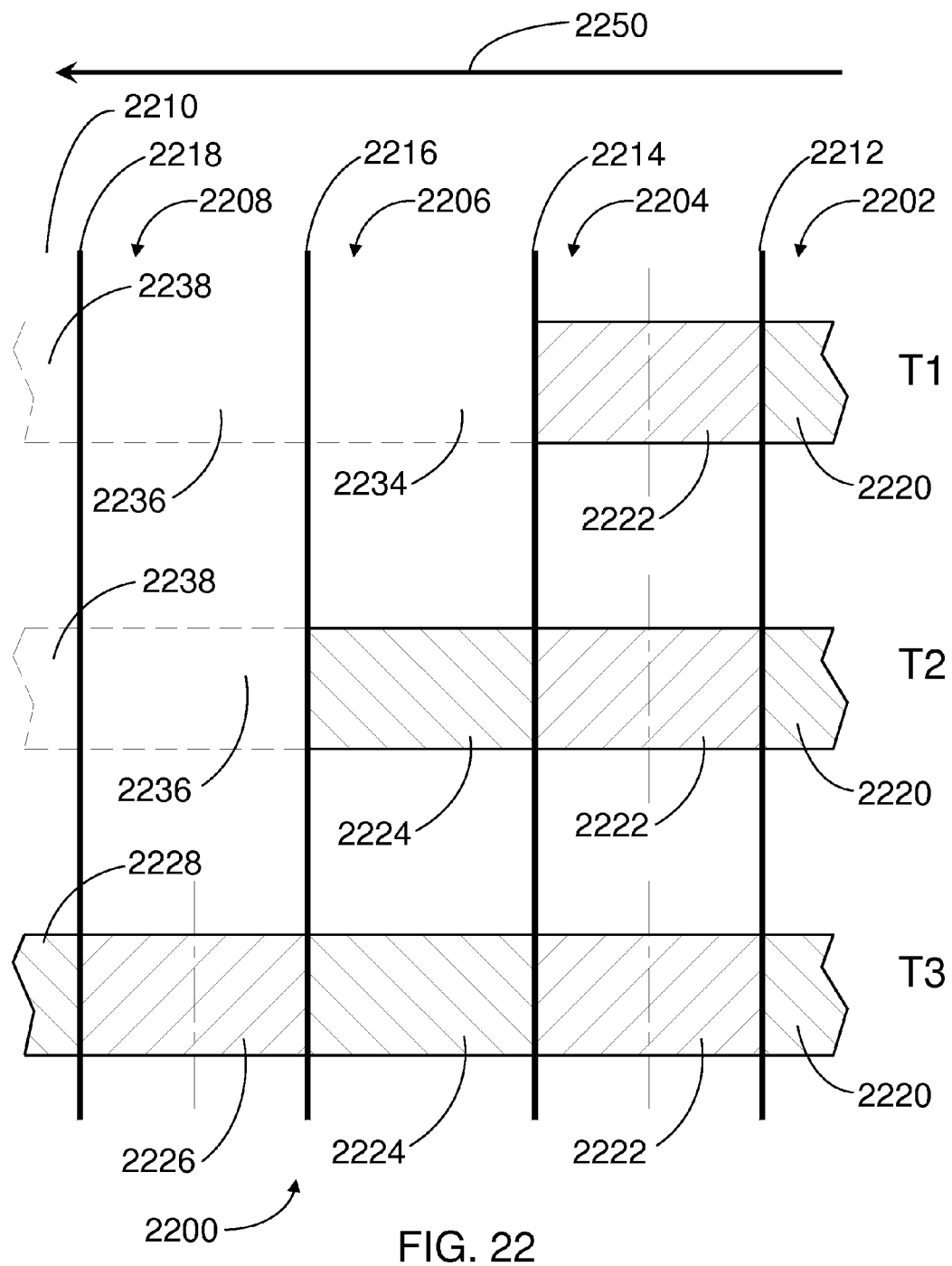
FIG. 22 is a schematic diagram of the self-servo writing (SSW) process where the disk storage medium has the nominal coercivity.

In FIGS. 11-16 and 18-21, the use of embodiments of the present invention to improve data writing in cases of coercivity variation were illustrated. Embodiments of the present invention are applicable to the self-servo writing of servo tracks as well. FIG. 22 is a schematic diagram 2200 of a self-servo writing (SSW) process where the disk storage medium has the nominal coercivity. Arrow 2250 shows the direction of serially writing servo patterns, such as 2220, 2222, 2224, 2226, and 2228 at successive times T1<T2<T3. Here we examine the writing of servo patterns radially along a single servo spoke at the three times T1, T2, and T3, starting from the I.D. and moving towards the O.D. Thus the disk center would be towards the right of FIG. 22 and the outer edge towards the left. At the top, corresponding to time T1, servo pattern 2220 was written previously and servo pattern 2222 has just been written. Empty region 2234 is where pattern 2224 will be written at time T2. Empty regions 2236 and 2238 are where patterns 2226 and 2228, respectively, will be written between times T2 and T3. At time T3, servo patterns 2220, 2222, 2224, 2226, and 2228 have all been written. Because the coercivity is nominal, all servo patterns are written correctly with no overlap. Servo pattern 2220 is fully within track 2202, pattern 2222 is fully within track 2204, pattern 2224 is fully within track 2206, pattern 2226 is fully within track 2208, and pattern 2228 is fully within track 2210. Boundaries 2212, 2214, 2216, and 2218 separate the tracks as shown.

Figure 23:
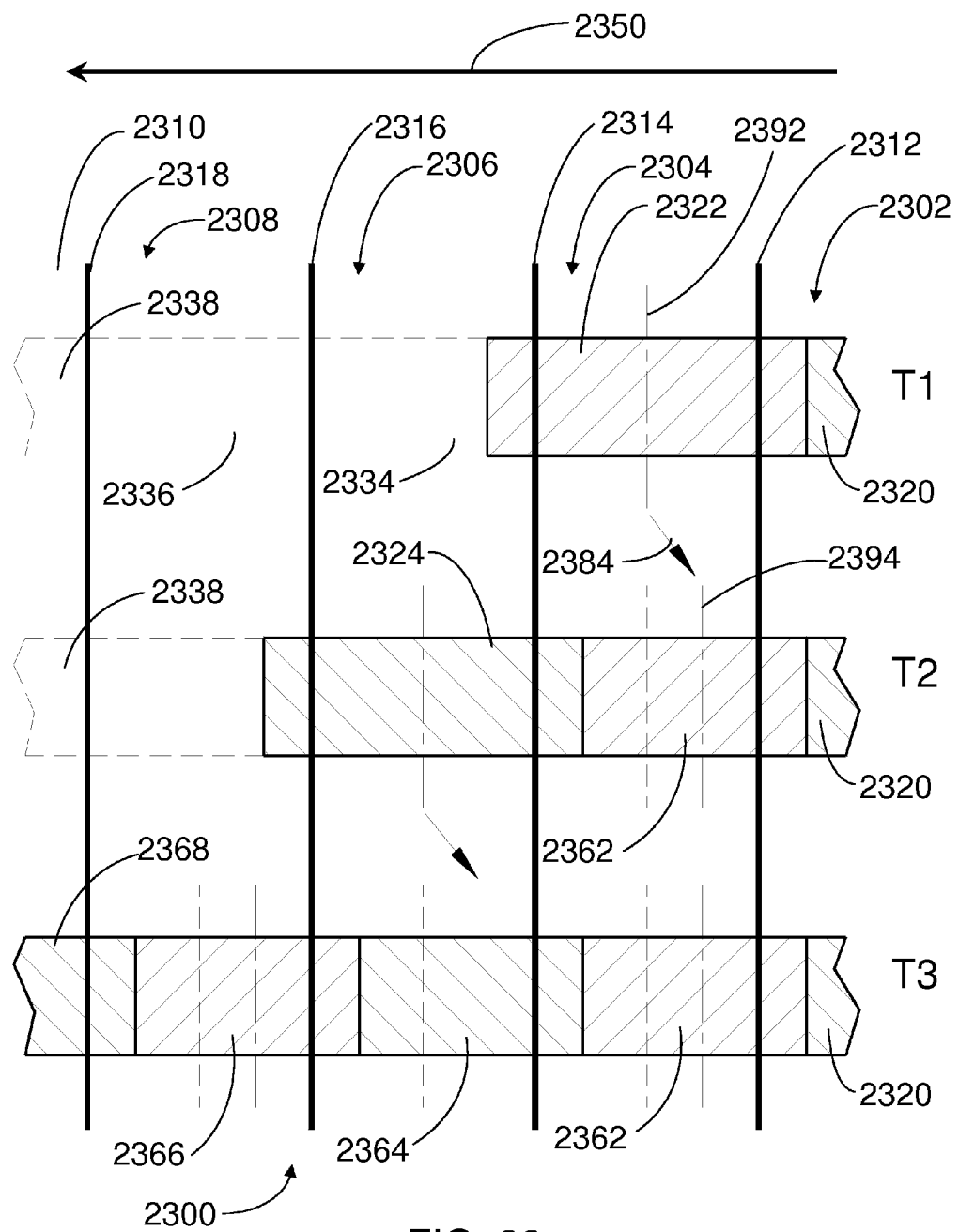
FIG. 23 is a schematic diagram of the self-servo writing process where the disk storage medium has a coercivity below the nominal value.

FIG. 23 is a schematic diagram 2300 of the self-servo writing process where the disk storage medium has a coercivity below the nominal value. In the absence of the control of writing width afforded by some embodiments of the present invention, here the servo patterns may be written wider than the nominal track widths. Servo pattern 2320 was previously written. Now at time T1, servo pattern 2322 has just been written with excessive width as shown, and as a result pattern 2322 extends out from track 2304 on both sides, overwriting part of pattern 2320. Empty region 2334 is where pattern 2324 will be written at time T2. Empty regions 2336 and 2338 are where patterns 2326 and 2328, respectively, will be written between times T2 and T3. Now at time T2, when pattern 2324 is written, it also has excessive width, and as a result overwrites part of pattern 2322 generating a smaller pattern 2362 whose center is offset to the right (arrow 2384) from the center of track 2304. Since this entire region of the disk has a lower coercivity (due to the low spatial frequency of variation in coercivity—see FIGS. 4-6), all the servo patterns in this spoke may have similarly excessive widths, and thus will overlap each other as shown. By time T3, servo patterns 2320, 2362, 2364, 2366, and 2368 may all demonstrate offsets to the right, potentially resulting in track locational errors. The control of writing width afforded by the present invention may prevent this servo patterning error.

First Procedure: Mapping of Coercivity on a Disk Storage Medium

Figure 24:
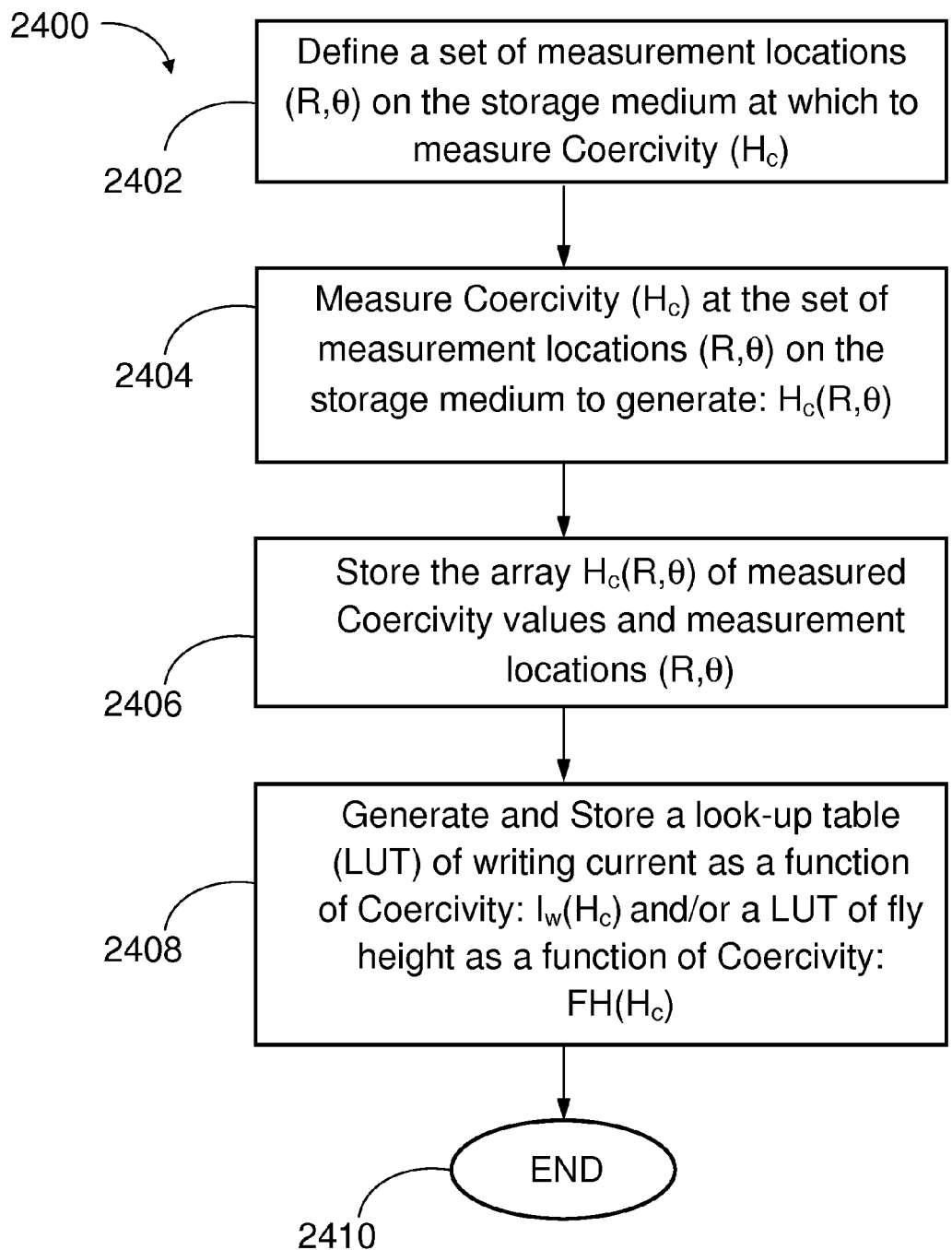
FIG. 24 is a flowchart for a first procedure according to some embodiments of the invention for measuring and storing coercivity values for a disk storage medium.

FIG. 24 is a flowchart for a first procedure 2400 according to some embodiments of the invention. First procedure 2400 is for measuring and storing coercivity values for a disk storage medium, and generates stored coercivity data for use in the second procedure 2500 in FIG. 25. In block 2402, a set of measurement locations (R,θ) may be defined by the disk controller, by the host computer, or by a system operator. Each measurement location (R,θ) defines a two-dimensional coordinate on the surface of the disk storage medium, characterized by a radius (R) and an azimuthal angle (θ). The number and overall spatial distribution of the measurement locations (R,θ) is determined by the expected spatial frequencies of coercivity variation. For example, if a 1F variation is expected (FIG. 4), a relatively small number of measurement locations (R,θ) could be required to provide adequate spatial resolution for some embodiments of the present invention. Conversely, if 2F and 3F spatial variations in coercivity are anticipated (FIGS. 5 and 6), then a larger number of measurement locations (R,θ) might be required since now the spatial rate of change in coercivity across the disk surface could be larger. Even in the case of a 1F disk, however, if the magnitude of the overall coercivity variation (i.e., the difference between the largest and smallest coercivities anywhere on the disk) is large, then a larger number of measurement locations (R,θ) may be preferred.

In block 2404, once the set of desired measurement locations (R,θ) has been determined, the coercivity, $H_c$, is measured at each (R,θ) location and in block 2406 the resulting values are stored in an $H_c(R,\theta)$ array along with the measurement locations (R,θ). In various embodiments, this array may be written on the disk, stored in a memory in the disk drive, or saved in another location such as in a host computer (see FIG. 26). In some embodiments, the $H_c(R,\theta)$ array may be stored in multiple locations.

Block 2408 generates and stores data to enable the data storage device to use the stored $H_c(R,\theta)$ array to control the writing width, by variation of the writing current and/or by variation of the fly height. A look-up table (LUT) may be generated containing the writing current for each coercivity: $I_w(H_c)$. A look-up table may be generated containing the fly height for each coercivity: $FH(H_c)$. At least one of these two LUTs may be preferred, depending on which mode of writing width control is desired (i.e., writing current or fly height). Both LUTs may be preferred in embodiments where the writing current and fly height may be varied (simultaneously and/or alternatively) to control the writing width.

Once the coercivity has been measured at all measurement locations (R,θ) and one or both LUTs have been generated in block 2408, the first procedure is completed in block 2410. An advantage of premeasuring the coercivity distribution across the disk storage medium prior to writing data is that time overheads may be reduced or eliminated since there is no requirement for coercivity measurements to be performed during writing.

Second Procedure: Data Writing with Compensation for Coercivity Variations

Figure 25:
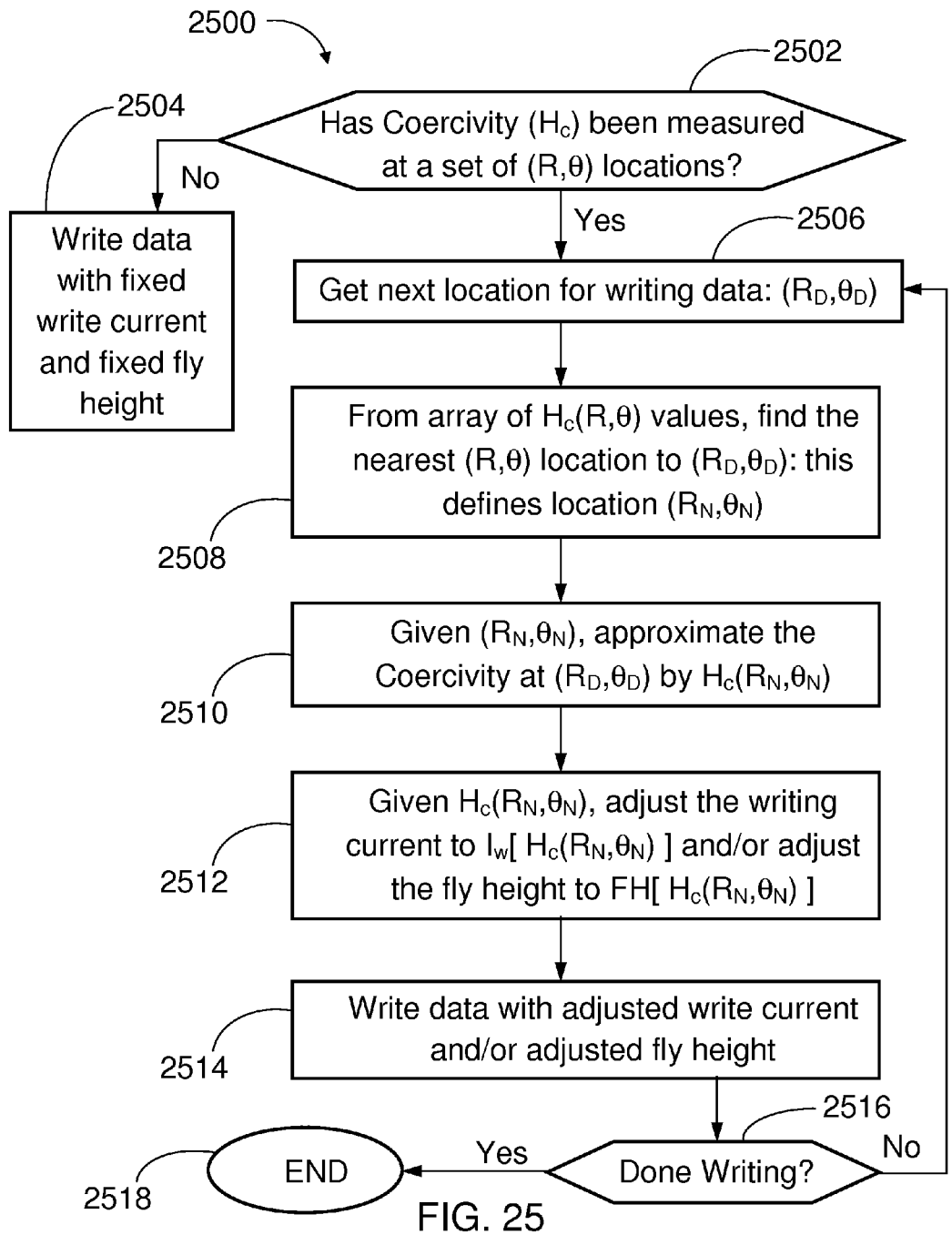
FIG. 25 is a flowchart for a second procedure according to some embodiments of the invention for adjusting the writing current and/or fly height to compensate for media coercivity variations.

FIG. 25 is a flowchart for a second procedure 2500 according to some embodiments of the invention. Second procedure 2500 is for adjusting the writing current and/or fly height to compensate for media coercivity variations during writing of data. Block 2502 checks whether the first procedure 2400 in FIG. 24 has been executed already. If the answer in block 2502 is "No", then the present invention cannot be employed, and block 2504 is entered to write data conventionally with fixed writing currents and fly heights, potentially resulting in writing width variations for disk storage media having varying coercivities. If the first procedure 2400 in FIG. 24 has been executed, then block 2506 is entered and a data writing process according to embodiments of the invention may commence.

In block 2506, a next data-writing location $(R_D, \theta_D)$ is obtained from the controller, host computer, or other source. In the following description, a radius (R) and angle (θ) terminology has been used to describe two-dimensional locations (R,θ) on the surface of a data storage medium. The commonly-used "track" (roughly equivalent to R) and "sector" (roughly equivalent to θ) notation may be used in place of (R,θ) coordinates within the scope of the invention. In block 2508, the array of $H_c(R,\theta)$ values (from block 2406 in FIG. 24) is searched to find the nearest measurement location (R,θ) to writing location $(R_D, \theta_D)$—this nearest measurement location is designated $(R_N, \theta_N)$. The coercivity at the writing location $(R_D, \theta_D)$ is termed the "writing coercivity" and is set equal to the value of $H_c(R_N, \theta_N)$ in block 2510. Thus the writing coercivity should closely approximate the actual coercivity of the magnetic storage medium at the writing location $(R_D, \theta_D)$. This highlights the importance of measuring the coercivity at a large enough number of measurement locations (R,θ) to ensure that this writing coercivity approximation is close enough for precise control of the writing width. Alternatively, two or more nearest measurement locations (R,θ) to writing location $(R_D, \theta_D)$ may be determined and the approximate coercivity at the writing location $(R_D, \theta_D)$ calculated by interpolation between the measured coercivities at the two or more nearest measurement locations (R,θ).

Now in block 2512, given the writing coercivity $H_c(R_N, \theta_N)$ from block 2510, a writing parameter may be adjusted using the look-up tables from block 2408 in flowchart 2400. In some embodiments, the writing parameter may be the writing current which could then be set to $I_w[H_c(R_N, \theta_N)]$ to effect compensation for coercivity variations. In some embodiments, the writing parameter may be the fly height which could be set to $FH[H_c(R_N, \theta_N)]$ to effect compensation for coercivity variations. In some embodiments, the writing parameter may comprise a plurality of parameters including writing current and fly height, which are modified to compensate for coercivity variations.

Block 2514 uses the modified writing current and/or modified fly height from block 2512 to write the data with the proper writing width. In some cases, it may be preferred to simultaneously employ both modifications of writing current and fly height to control the writing width. In still other cases, it may be preferred to choose either the writing current or the fly height to control the writing width. All possible combinations of single parameter (writing current or fly height) and/or dual parameter (writing current and fly height) control fall within the scope of the invention.

If data writing is complete after block 2514, block 2516 directs the process flow to completion block 2518, or, if data writing is incomplete after block 2514, the process flow returns to block 2506 as shown.

Data Storage System in Accordance with Embodiments of the Invention

Figure 26:
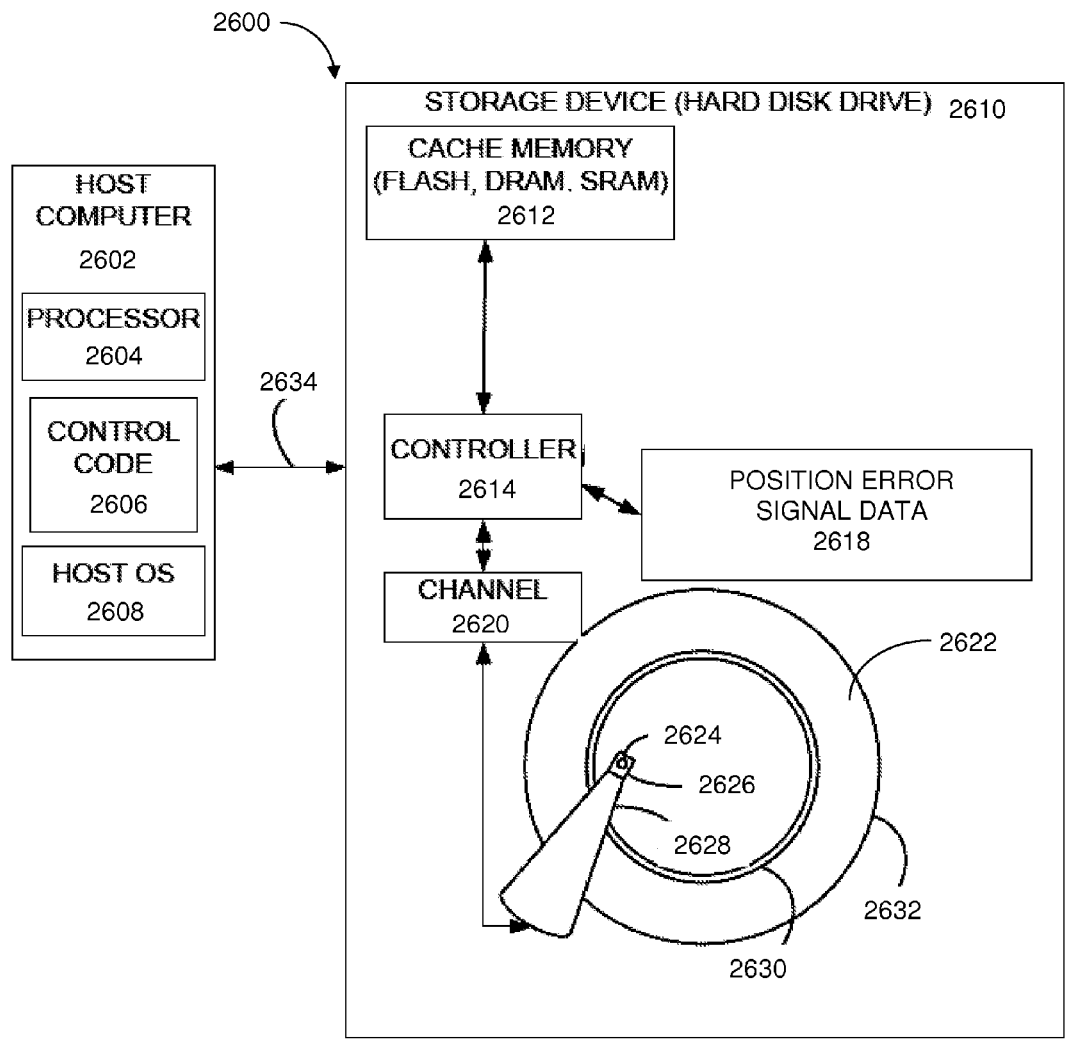
FIG. 26 is a schematic diagram of a data storage system according to the invention.

FIG. 26 is a schematic diagram of a data storage system 2600 embodying the present invention. System 2600 includes a host computer 2602, a storage device 2610, such as a hard disk drive 2610, and an interface 2634 between the host computer 2602 and the storage device 2610. Host computer 2602 includes a processor 2604, a host operating system 2608, and control code 2606. The storage device or hard disk drive 2610 includes a controller 2614 coupled to a data channel 2620. The storage device or hard disk drive 2610 includes an arm 2628 carrying a read/write head including a read element 2624, and a write element 2626.

In operation, host operating system (OS) 2608 in host computer 2602 sends commands to hard disk drive 2610 through interface 2634. In response to these commands, hard disk drive 2610 performs requested functions such as reading, writing, and erasing data, on disk surface 2622. Controller circuit 2614 causes write element 2626 to record magnetic patterns of data on a writable surface of disk 2622 in tracks 2630. The controller circuit 2614 positions the read head 2624 and write head 2626 over the recordable or writable surface 2622 of a disk 2632 by locking a servo loop to predetermined servo patterns, typically located in servo spokes or zones. The predetermined servo pattern (as in FIGS. 22 and 23) may include a preamble field, a servo sync-mark (SSM) field, a track/sector identification (ID) field, a plurality of position error signal (PES) fields, and a plurality of repeatable run out (RRO) fields following the burst fields.

In accordance with embodiments of the invention, system 2600 includes a cache memory 2612, for example, implemented with one or a more of: a flash memory, a dynamic random access memory (DRAM) and a static random access memory (SRAM). Position error signal (PES) data may be stored in memory 2618.

System 2600 including the host computer 2602 and the storage device or hard disk drive 2610 is shown in simplified form sufficient for understanding the present invention. The illustrated host computer 2602 together with the storage device or hard disk drive 2610 is not intended to imply architectural or functional limitations. The present invention can be used with various hardware implementations and systems and various other internal hardware devices.

The methods of the present invention may be implemented by the host computer 2602 and/or the controller 2614 or a combination of both. The measured coercivity data and look-up tables described in FIGS. 24 and 25 may be stored in cache memory 2612, in the host computer 2602, written on disk medium 2622, or saved in another location. The measured data and look-up tables may be stored in multiple locations.

Measurement Method for the Writing Width and Coercivity

Block 2404 in flowchart 2400 requires some method for measuring the coercivity of the magnetic disk storage medium. A number of such methods are known to those skilled in the art and the specific method used to measure coercivity in block 2404 is not part of the present invention. This section describes a method for measurement of writing width which may be used to derive the local coercivity at a number of locations on a disk. First, test patterns are written on all sectors (angles, θ) on a particular track (radius, R). The read head is then sequentially positioned at a number of offtrack locations (i.e., the read head is intentionally offset from the track centerline) to readback signals from the test patterns. As the read head is moved farther offtrack (to either side of the track centerline), the readback signal will diminish due to the decrease in overlap between the test patterns and the read head. This process is described in FIGS. 27 and 28.

Figure 27:
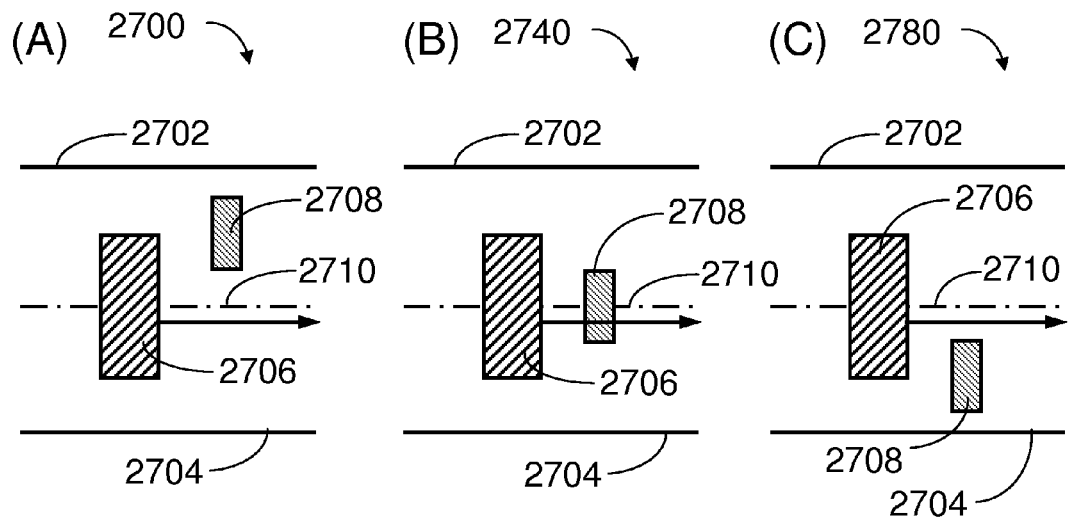
FIG. 27 illustrates the write head and read head locations for measuring the writing width.

FIG. 27 views (A)-(C) show three examples 2700, 2740 and 2780, of a test pattern 2706 moving past a read head 2708 (as indicated by the three arrows showing the direction of disk rotation) with various off-track locations. The track is bounded by edges 2702 and 2704 with a centerline 2710. In view (A) 2700, read head 2708 has intentionally been positioned off-track closer to track edge 2702, extending 50% off of test pattern 2706. In view (B) 2740, read head 2708 has been positioned on the centerline 2710 so that it completely overlaps test pattern 2706 and thus will have the maximum readback signal strength. In view (C) 2780, read head 2708 has been moved closer to edge 2704, giving a 50% overlap with test pattern 2706. In the actual read operation, of course, the exact width of test pattern 2706 (corresponding to the writing width for the local coercivity and writing current) is unknown, so a larger number of track offsets would be employed for a larger number of readback signal measurements.

Figure 28:
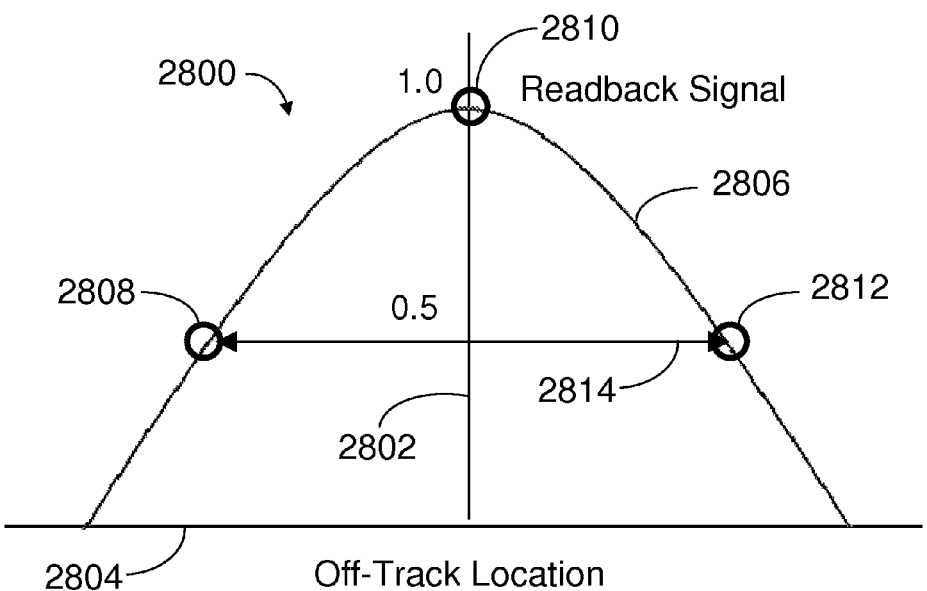
FIG. 28 is a graph of the readback signals corresponding to FIG. 27.

FIG. 28 is a schematic graph 2800 of the normalized readback signals 2802 for various off-track locations 2804. Curve 2806 is at a maximum 2810 at the center, corresponding to view (B) in FIG. 27. Views (A) and (C) correspond to points 2808 and 2812 on curve 2806, at a normalized readback signal strength of 0.5, resulting from the 50% overlap of read head 2708 with the test pattern 2706. The length of arrow 2814, extending between points 2808 and 2812, corresponds to the writing width for test pattern 2706. When the test patterns are being written, the coercivity is not known. The writing current is known and may be varied. The nominal writing width is predefined, based on the desired TPI for the disk storage medium. By systematically varying the writing current, then writing test patterns, followed by the above readback procedure, it is possible to find the writing current for each track and sector $(R,\theta)$ which generates test patterns having the nominal writing width. In addition, this method also determines the variation in writing width as a function of the writing current (because a number of writing currents are employed to determine a desired writing current)—this is the $I_w(H_c)$ data needed in block 2408 of flowchart 2400. Note that for any given writing current, due to azimuthal coercivity variations, the writing width around any track may vary above and below the nominal writing width, as the coercivity varies below and above the nominal coercivity azimuthally around the track. A similar procedure may be followed in which the fly height is systematically varied, instead of the writing current. This enables the $FH(H_c)$ function in block 2408 of flowchart 2400 to be determined.

Another approach to compensating for coercivity variations is to directly tie the writing width to the required writing current and fly height as a function of $(R,\theta)$ across the disk, without determining the coercivity. In this case, the above procedure would be used to find the writing current $I_w(R,\theta)$ and fly height $FH(R,\theta)$ for each location $(R,\theta)$ [equivalent to track and sector] which generates the nominal writing width. Variations in the coercivity across the disk (see FIGS. 4-6) will induce variations in these two functions, $I_w$ and $FH$. In mathematical terms, we have substituted the function $I_w(R,\theta)$ for the function $I_w[H_c(R,\theta)]$ and the function $FH(R,\theta)$ for the function $FH[H_c(R,\theta)]$. Thus in this case there is no need to determine the coercivity which may be thought of as an intermediate parameter tying the writing width to the writing current and fly height. This more direct approach falls within the scope of the invention.

Alternative Embodiments Within The Scope Of The Present Invention

Although the present invention has been described in the context of hard disk drives, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

We claim as follows:

1. A method for adjusting a writing parameter of a disk drive to compensate a writing width for variations in coercivity in a magnetic storage medium, comprising:
    a first procedure, comprising:
        defining a multiplicity of measurement locations on the magnetic storage medium;
        setting the writing parameter to a first value;
        writing a test pattern at each measurement location;
        measuring a writing width at of the test pattern each measurement location; and
        storing the measured writing widths, the measurement locations, and the writing parameter; and
        repeating the setting the writing parameter, the writing a test pattern, the measuring a writing width, and the storing the measured writing widths for a multiplicity of writing parameter values;
    a second procedure, comprising:
        receiving a writing location at which data is to be written from a control system of the disk drive;
        calculating a writing parameter at the writing location to provide a nominal writing width using the measured writing widths, the measurement locations, and the writing parameters stored in the first procedure;
        modifying the writing parameter to the calculated writing parameter value; and
        writing data to the magnetic storage medium using the modified writing parameter.

2. The method of claim 1, wherein the second procedure is performed after completion of the first procedure.

3. The method of claim 1, wherein the storing the measured writing widths, the measurement locations, and the writing parameter comprises storing the measured writing widths, the measurement locations, and the writing parameter on a disk storage medium.

4. The method of claim 1, wherein the storing the measured writing widths, the measurement locations, and the writing parameter comprises storing the measured writing widths, the measurement locations, and the writing parameter in a cache memory.

5. The method of claim 1, wherein the calculating a writing parameter comprises:
    calculating a multiplicity of distances between each stored measurement location and the writing location;
    determining the closest measurement location to the writing location from the calculated multiplicity of distances; and
    setting the writing parameter to the value of the stored writing parameter at the determined closest measurement location.

6. The method of claim 1, wherein the calculating a writing coercivity comprises:
    calculating a multiplicity of distances between each stored measurement location and the writing location;

determining a plurality of closest measurement locations to the writing location from the calculated multiplicity of distances; and setting the writing parameter to the interpolated value of the stored writing parameters at the plurality of closest measurement locations.

7. The method of claim 1, wherein the writing parameter is a writing current in a write head of the disk drive.

8. The method of claim 1, wherein the writing parameter is a fly height of a write head of the disk drive.

9. The method of claim 8, wherein modifying the writing parameter comprises use of thermal fly height control.

10. The method of claim 1, wherein the writing parameter comprises the writing current and the fly height.

11. The method of claim 10, wherein modifying the writing parameter comprises use of thermal fly height control.

12. A data storage system, comprising:
a rotating data storage medium:
a read/write head assembly, comprising a read head configured to read data from the rotating data storage medium, and a write head configured to write data to the rotating data storage medium; and
a controller for controlling the position of the read/write head assembly relative to the rotating data storage medium, wherein the controller is configured to execute two procedures, wherein:
the first procedure comprises the steps of:
setting a writing parameter to a first value;
positioning the read/write head at each location in a multiplicity of predefined measurement locations;
writing a test pattern at each measurement location;
measuring the writing width of the test pattern at each measurement location;
storing the measured writing widths, measurement locations, and writing parameter; and
repeating the positioning the read/write head, the writing a multiplicity of test patterns, the measuring the writing width, and the storing the measured writing widths for a multiplicity of writing parameter values; and
the second procedure comprises the steps of:
receiving a writing location at which data is to be written from a control system of the data storage system;
calculating a writing parameter at the writing location to provide a nominal writing width using the measured writing widths, the measurement locations, and the writing parameters stored in the first procedure;
modifying the writing parameter to the calculated writing parameter value; and
writing data to the magnetic storage medium using the modified writing parameter.

13. The data storage system of claim 12, wherein the controller is configured to store the measured writing widths, the measurement locations, and the writing parameter on a disk storage medium.

14. The data storage system of claim 12, wherein the controller is configured to store the measured writing widths, the measurement locations, and the writing parameter in a cache memory.

15. The data storage system of claim 12, wherein the writing parameter is a writing current in a write head of the data storage system.

16. The data storage system of claim 12, wherein the writing parameter is a fly height of a write head of the data storage system.

17. The data storage system of claim 16, wherein modifying the writing parameter comprises use of thermal fly height control.

18. The data storage system of claim 12, wherein the writing parameter comprises the writing current and the fly height.

19. The data storage system of claim 18, wherein modifying the writing parameter comprises use of thermal fly height control.

* * * * *